(12) United States Patent
Schumacher

(10) Patent No.: US 11,974,129 B2
(45) Date of Patent: Apr. 30, 2024

(54) TOKEN-BASED SECURITY RISK ASSESSMENT FOR MULTI-FACTOR AUTHENTICATION

(71) Applicant: T-Mobile USA, Inc., Bellevue, WA (US)

(72) Inventor: Gregory David Schumacher, Holliston, MA (US)

(73) Assignee: T-Mobile USA, Inc., Bellevue, WA (US)

( * ) Notice: Subject to any disclaimer, the term of this patent is extended or adjusted under 35 U.S.C. 154(b) by 389 days.

(21) Appl. No.: 17/505,463

(22) Filed: Oct. 19, 2021

(65) Prior Publication Data

US 2023/0117620 A1    Apr. 20, 2023

(51) Int. Cl.
*H04W 12/06*  (2021.01)
*H04L 9/40*  (2022.01)
*H04W 12/72*  (2021.01)
*H04L 101/654*  (2022.01)

(52) U.S. Cl.
CPC ......... *H04W 12/06* (2013.01); *H04L 63/0807* (2013.01); *H04W 12/72* (2021.01); *H04L 2101/654* (2022.05); *H04L 2463/082* (2013.01)

(58) Field of Classification Search
CPC ..... H04W 12/06; H04W 12/72; H04W 12/40; H04L 63/0807; H04L 2101/654; H04L 2463/082
See application file for complete search history.

(56) References Cited

U.S. PATENT DOCUMENTS

| | | | |
|---|---|---|---|
| 10,348,721 B2 * | 7/2019 | Wang | H04L 63/083 |
| 11,223,957 B1 * | 1/2022 | Mouton | H04W 12/48 |
| 2016/0261581 A1 * | 9/2016 | Wang | H04L 63/083 |
| 2021/0185529 A1 * | 6/2021 | Patil | H04W 8/04 |

* cited by examiner

*Primary Examiner* — Baotran N To
(74) *Attorney, Agent, or Firm* — Lee & Hayes, P.C.

(57) ABSTRACT

A token-based security risk assessment service for multi-factor authentication (MFA) is described. An enterprise may utilize the security risk assessment service, and a telecommunication service provider may provide the security risk assessment service as a network-based service. The security risk assessment service may be configured to monitor identifiers (IDs) of elements associated with users associated with an enterprise to determine if any have changed. Any changes may be factored into an adjustment to the user's security profile. Furthermore, the enterprise can utilize the security risk assessment service to implement a token-based MFA scheme where Short Message Service (SMS) is used as an authentication factor.

20 Claims, 11 Drawing Sheets

TOKEN-BASED SECURITY RISK ASSESSMENT FOR MULTI-FACTOR AUTHENTICATION

BACKGROUND

Enterprise security is a growing concern as more employees transition to remote working arrangements, and as the enabling technology for such remote working arrangements improves. Many of today's enterprises have adopted a "Zero Trust" model for their enterprise security. Zero Trust is a "never trust, always verify" model for enterprise security, where each request to access enterprise resources is to be authenticated and authorized before access is granted to the requesting end user, and where subsequent requests from the same end user are frequently re-authenticated. A common way to authenticate end users (e.g., employees of an enterprise) is through multi-factor authentication (MFA). Short Message Service (SMS) has been used as an authentication factor in many MFA schemes.

Despite its utility for MFA, SMS has a number of known vulnerabilities. These vulnerabilities have limited the security strength of SMS, and they have even led to the National Institute of Standards and Technology (NIST) deprecating SMS as an authentication factor in MFA. For example, known attack strategies, such as "Subscriber Identity Module (SIM) Swap" attacks, have compromised the security strength of MFA using SMS. A SIM Swap attack involves an attacker gathering publicly-available information about the attack target. The attacker then calls a customer support center of the target's mobile network operator, and the attacker impersonates the target using the publicly-available information to convince the operator to switch SIM cards to one that is in possession of the attacker, usually by claiming a lost or stolen device and/or SIM card. Then the attacker will attempt to access the target's private information, such as a bank account, and the bank, using SMS-based MFA, sends an authentication code to the attacker's SIM instead of the target's SIM, thereby granting the attacker access to the target's financial resources. In this attack scenario, the International Mobile Subscriber Identity (IMSI) of the target (and possibly other identifiers associated with the target) may change when the mobile network operator switches SIM cards at the request of the attacker under the guise of the target. One problem today is that an enterprise is unaware of changes made to the identifiers (e.g., the IMSIs) that are associated with its employees, even when a legitimate employee initiates the change, let alone when a malicious actor does so. As a result, enterprises continue to implement a Zero Trust model where MFA is typically performed more frequently than prior security approaches and/or with non-SMS authentication factors, and this is a direct result of an inability to trust in the security of using SMS as an authentication factor in MFA. The FCC has also initiated a Notice of Public Rule Making (NPRM FCC-21-102) seeking to deter these SIM hijacking and Port-Out fraud.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
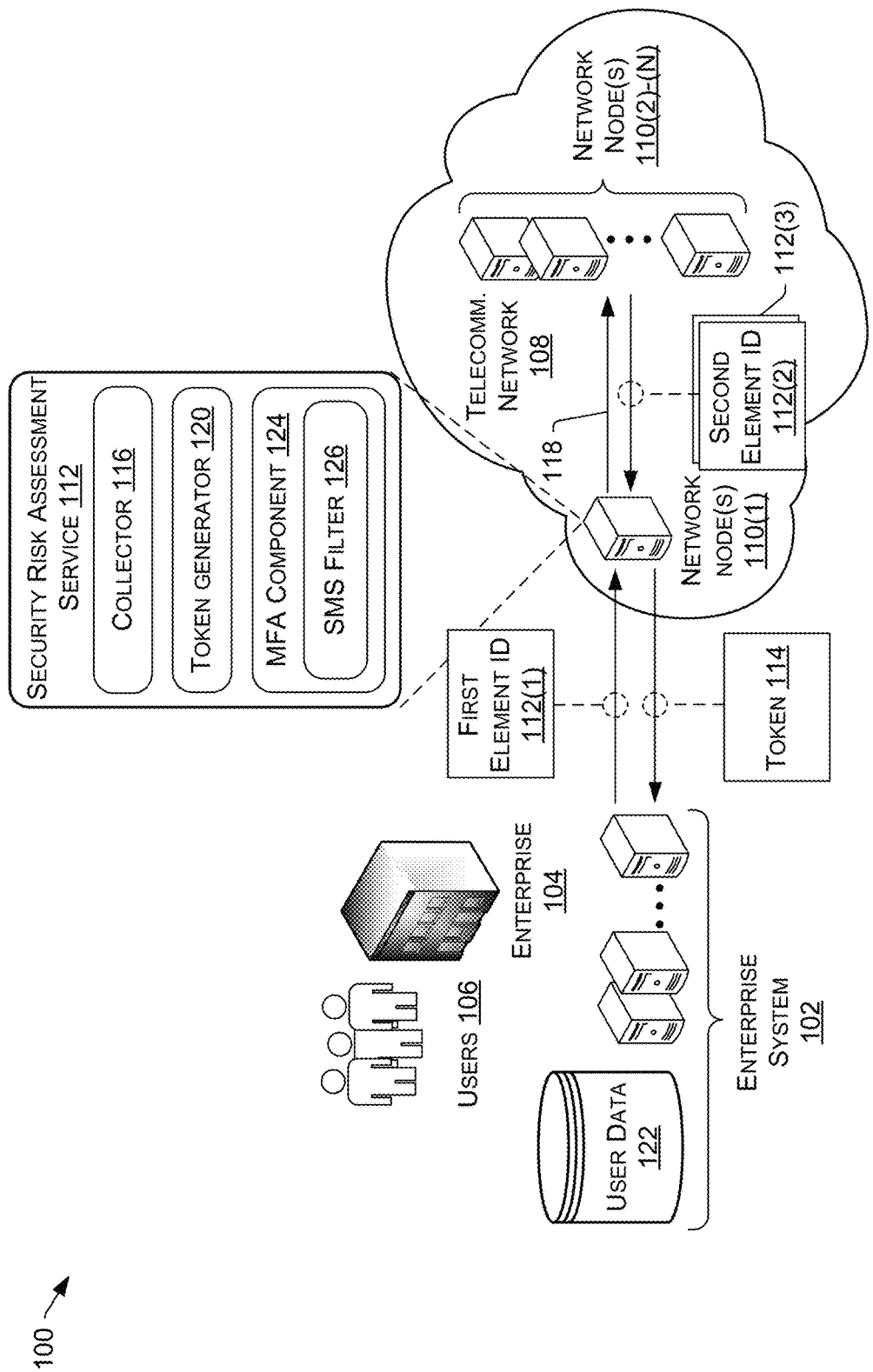
FIG. 1 illustrates a technique for generating a token that represents an association between element identifiers associated with a user associated with an enterprise, according to various embodiments.

Described herein are techniques, devices, and systems for implementing a token-based security risk assessment service (sometimes shortened to "security risk assessment service") for MFA. An enterprise may utilize the security risk assessment service. Meanwhile, a telecommunication service provider (e.g., a wireless carrier) may provide the security risk assessment service as a network-based service. The security risk assessment service may be configured to monitor identifiers (IDs) of elements (sometimes referred to herein as "key elements") associated with users associated with an enterprise. Examples of such elements include, without limitation, a phone number, a Universal Subscriber Identity Module (USIM), and a user equipment (UE).

Initially, an enterprise may establish a baseline security profile associated with one of its users, and, after establishing the baseline security profile for the user, the security risk assessment service can be utilized to determine whether any changes are made to the IDs of the elements that are associated with the user. Any changes to the element IDs associated with the user may be factored into an adjustment to the user's security profile. Furthermore, the enterprise can utilize the security risk assessment service to implement a token-based MFA scheme where SMS is used as an authentication factor.

To illustrate, a network node(s) of a telecommunications network may include logic for implementing the security risk assessment service described herein. An enterprise system may initially send, to the network node(s), an ID of a first element associated with a user. In an example, this element ID may be a Mobile Station International Subscriber Directory Number (MSISDN) that identifies a personal phone number (e.g., a home telephone number, a cellular telephone number, etc.) associated with the user. Such a phone number may have been furnished by the user to the enterprise, either voluntarily or as a condition of his/her employment with the enterprise. The network node(s) may validate the ID (e.g., the MSISDN) of the first element (e.g., the phone number), and, if valid, the network node(s) may obtain, from another network node(s) of the telecommunications network, one or more additional element IDs associated with the user. For example, the network node(s) may obtain an IMSI that identifies a USIM associated with the user and/or an International Mobile Equipment Identity (IMEI) that identifies a UE associated with the user. Using the obtained element ID(s) together with the enterprise-provided element ID, the network node(s) may generate a token. In an illustrative example, the token can be a hash value representing an association between the element IDs associated with the user. This token may be sent to the enterprise system and stored to establish a baseline security profile for the user. The baseline security profile may be indicative of the level of trust in using SMS as an authentication factor for MFA with respect to the particular employee.

Once a baseline security profile is established for the user, the enterprise can be notified of any changes to an element ID(s) of the user since the last token was generated for the user. For example, after generating a first token, the network node(s) may obtain, at some later time, the current element IDs associated with the user, and the network node(s) may generate a second token based at least in part on the current element IDs obtained at the later time. The network node(s) is configured to compare the second token with the previously-generated first token to determine if any of the element IDs have changed since the first token was generated (e.g., based on a token mismatch), and if so, the network node(s) can notify the enterprise about the change so that the enterprise can adjust the security profile of the user, as desired.

Additionally, or alternatively, any token provided to the enterprise system can be utilized in a token-based MFA scheme where SMS is used as an authentication factor. For example, when the enterprise system invokes MFA for a given employee who is trying to access enterprise resources from a remote location, the enterprise system may send, to the network node(s), (i) a SMS message for use in authenticating the user using MFA, and (ii) the token that the enterprise system has in its possession (e.g., stored in memory). The network node(s) can then generate a second token based on the current element IDs associated with the user, which may be obtained from one or more other network nodes of the telecommunications network. If the second token matches the enterprise-provided token, the network node(s) can be reasonably-assured that sending the SMS message to a UE of the user for use in MFA is going to be secure. If there is a token mismatch, the network node(s) may flag this condition as a security risk, and one or more security-based actions can be taken based on the token mismatch, such as refraining from sending the SMS to the UE of the user, implementing one or more additional security measures in order to authenticate the user, and/or other security-based actions.

The techniques, devices, and systems described herein provide a reporting mechanism to notify an enterprise as to any changes that may have been made to the IDs of elements that are associated with its users. This reporting mechanism provides the enterprise with insight regarding potential security risks involved in using SMS as an authentication factor for MFA with respect to a particular employee. For example, if the enterprise receives a notification from the security risk assessment service that an element ID associated with a given employee has changed since the last time a token was generated for that employee, the enterprise may take this into account in terms of a level of trust the enterprise is willing to ascribe to the security strength of using SMS as an authentication factor in MFA for the given employee. The techniques, devices, and systems described herein also preserve anonymity of users because the security risk assessment service is not required to share any private information about users with the enterprise. For example, the tokens generated for users may be hashed with a cryptographic hash function to obscure the element IDs associated with the users. Furthermore, the token-based MFA scheme described herein improves the security of MFA by utilizing the token as a real-time security risk assessment tool/mechanism, thereby effecting an improvement to security technology. For example, the disclosed security improvements provided by the token-based MFA scheme facilitate authorized remote access to sensitive information (e.g., enterprise resources, such as computers, data, etc.) without compromising the security of that sensitive information. The disclosed security improvements also prevent attackers from remotely accessing such sensitive information. The techniques, devices, and systems described herein may further allow one or more devices to conserve resources with respect to processing resources, memory resources, networking resources, power resources, etc., in the various ways described herein. For example, if the element IDs of a given employee remain unchanged for a period of time, the security profile of that employee can allow for employing MFA less frequently for that employee based on the notion that the user's remote access to enterprise resources can be trusted. Reducing the frequency at which MFA is utilized for authenticating a user may conserve networking resources, among other resources, such as by refraining from sending messages to a UE of the user where such messages would otherwise be transmitted more frequently in a Zero Trust model for enterprise security.

Disclosed herein are example processes, as well as systems and devices comprising one or more processors and one or more memories, as well as non-transitory computer-readable media storing computer-executable instructions that, when executed, by one or more processors perform various acts and/or processes disclosed herein. Although many examples are described with respect to using SMS as an authentication factor in MFA, it is to be appreciated that the techniques, systems, and devices described herein may be implemented in non-SMS applications, such as an authenticator application installed on a UE that receives a message via a network for use in MFA. For example, if an end user connects to a remote system through a secure connection, such as IP Security (IPsec) or Transport Layer Security (TLS), via an authenticator application, a system implementing the security risk assessment service described herein may determine the network and/or the path through the network through which the end user is communicating. The system may also identify the UE of the end user based on information obtained through a means other than the device itself. An authenticator application may send a MFA (e.g., 2FA) message to the end user UE in different ways, at different times (e.g., sometimes SMS, sometimes directly to the authenticator application, sometimes requesting a fingerprint, etc.). This unpredictability in the path through the network that is used can make it difficult for attackers to breach the security measures. Meanwhile, various techniques may be used by the system implementing the security risk assessment service to provide an attested linkage between IP address/port and any third generation Partnership Project (3GPP) element IDs (e.g., MSISDN, IMSI, IMEI, etc.). One example technique to provide an attested linkage in a non-SMS implementation is to use an application programming interface (API) that receives an IP address and a socket and that returns an element ID associated with the UE currently assigned to that tuple. Another example technique to provide an attested linkage in a non-SMS implementation is for the authenticator application running on a UE to obtain the element ID (e.g., MSISDN, IMSI, IMEI, etc.) programmatically from the operating system (OS) of the UE, and to send the obtained element ID to the network node(s) to verify (e.g. ensure that there is not an attacker somehow maliciously modifying the element ID on the UE). Yet another example technique to provide an attested linkage in a non-SMS implementation is for the authenticator application running on a UE to obtain the element ID (e.g., MSISDN, IMSI, IMEI, etc.) programmatically from the OS of the UE, and to send the obtained element ID to the enterprise system securely (e.g., confidentiality and integrity-protected) to verify.

FIG. 1 illustrates a technique for generating a token that represents an association between element IDs associated with a user associated with an enterprise, according to various embodiments. An environment 100 depicted in FIG. 1 may include an enterprise system 102 associated with an enterprise 104. The enterprise 104 may represent any suitable entity, such as an organization, a company, a business entity, an employer, a merchant, or the like. Users 106 may be employed by the enterprise 104, and, therefore, the users 106 may represent employees of the enterprise 104, in some examples. In an example, the enterprise 104 may be a company that manufactures and sells a product and/or that provides a service to customers, and the users 106 may work as employees for the enterprise 104 to manufacture, market, and/or sell the product and/or to provide the service to customers of the enterprise 104. In other examples, the users 106 may represent customers, users in the general public, or any other suitable type of user. In an example, the enterprise 104 may represent a bank, and the users 106 may represent customers of the bank.

FIG. 1 also depicts a telecommunications network 108 to which the enterprise system 102 is communicatively coupled. For example, the enterprise system 102 may be configured with a communications interface(s) to transmit/receive data to/from one or more nodes of the telecommunications network 108. The telecommunications network 108 can be maintained and/or operated by one or more service providers, such as one or more wireless carriers (or "operators"). In some examples, the telecommunications network 108 may represent and/or include a core network having network nodes 110(1), 110(2), . . . 110(N) (collectively 110). For example, the telecommunications network 108 may represent and/or include a fifth generation (5G) core network that includes 5G network nodes 110. Such network nodes 110 may include, without limitation, an identify verification function (IVF), a policy control function (PCF), a session management function (SMF), an access and mobility management function (AMF), an authentication server function (AUSF), a user plane function (UPF), and the like. In some examples, the telecommunications network 108 may represent and/or include an Internet Protocol Multimedia Subsystem (IMS) core network, sometimes referred to herein as "IMS core," "IMS network," "Core Network (CN)," or "IM CN Subsystem". The IMS core is an architectural framework defined by the 3GPP for delivering Internet Protocol (IP) multimedia to UEs. In some examples, the telecommunications network 108 may include one or more access networks, including radio access networks (RANs) and/or radio access technologies (RATs), in order to access certain ones of the network nodes 110. In general, the nodes 110 are capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Voice over NR (VoNR), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5G NR networking protocols, and/or existing or legacy network technology, such as second generation (2G), third generation (3G), fourth generation (4G), including circuit-switched networking protocols and/or packet-switched networking protocols.

The enterprise system 102 may include computing devices (e.g., server computers) maintained and/or operated by the enterprise 104, and/or on behalf of the enterprise 104, as a security service and/or authentication service. For example, the enterprise system 102 may represent and/or include an on-premise system that is managed by personnel of the enterprise 104 itself. Additionally, or alternatively, the enterprise system 102 may represent and/or include a service provider network that is operated by a third party service provider to provide cloud-based, scalable, and network accessible (or network-based) compute power services, storage services, database services, security services, and/or other services to the enterprise 104. In particular, the enterprise system 102 may be configured to implement a MFA scheme on behalf of the enterprise 104 to enable users 106 associated with the enterprise 104 to access enterprise resources (e.g., computers, data, etc.) remotely. For example, users 106 may login via a remote access protocol to access the enterprise system 102, and before the users 106 are granted access, the users 106 may authenticate via the MFA scheme to prove that the users 106 are who they say they are.

The enterprise system 102 may be configured to interact with at least a first network node(s) 110(1) of the telecommunications network 108 via one or more APIs. In some examples, the first network node 110(1) represents an IVF.

In some examples, the enterprise system 102 and/or the first network node 110(1) can be virtualized or containerized functions, and/or they can be deployed in cloud environments. The first network node(s) 110(1) may utilize one or more APIs to interact with the enterprise system 102 and may utilize one or more APIs to interact with one or more other/additional network nodes 110(2)-(N) of the telecommunications network 108. As illustrated in FIG. 1, the first network node 110(1) is configured to implement a token-based security risk assessment service 112 (sometimes shortened herein to "security risk assessment service 112," as in FIG. 1, or simply "service 112") for MFA. It is to be appreciated that the service 112 may be accessible to multiple enterprise customers or clients, even though a single enterprise 104 is depicted in FIG. 1.

The service 112 may be configured to monitor IDs of elements (sometimes referred to herein as "key elements") associated with users associated with an enterprise, such as the users 106 associated with the enterprise 104 depicted in FIG. 1. Examples of such elements include, without limitation, a phone number, a USIM, and a UE. Each example element is discussed in turn below.

The phone number is an example of an element that can be used by a caller to contact a desired person associated with the phone number. The phone number can also be used for routing a call through a network (e.g., a public switched telephone network (PSTN)) toward the intended called party. The phone number can also be used for SMS, albeit through a different infrastructure than for calls. The MSISDN is an ID of the phone number, and is hence an example of an element ID. The MSISDN is stored in the user's USIM and can be changed through remote mechanisms such as over-the-air (OTA). There are a number of reasons why the MSISDN in the USIM would change legitimately including, without limitation, number portability (Local Number Portability (LNP) in the US) where the subscriber changes public land mobile network (PLMN) operators but retains his/her phone number, or a USIM replacement where the MSISDN from the lost/stolen/upgraded USIM is installed in the new USIM. In the example of FIG. 1, the first element ID 112(1) may represent a MSISDN associated with a user 106.

The USIM is an example of an element in the form of a secure enclave including a number of subscriber/user-related configuration settings, as well as subscriber/user-related information elements that are to be secured, such as security credentials. The subscriber/user is identified by an IMSI, and every active USIM contains a unique IMSI. Hence, the IMSI is another example of an element ID. USIMs generally are removable and swappable, so a user/subscriber can move their 3GPP network context between different devices and continue to receive the services to which they have subscribed. Also, a user is able to have multiple subscriptions identified by a different IMSI in each USIM and swap between USIMs in a device. Generally, there is no knowledge or association between the multiple subscriptions/USIMs. In the example of FIG. 1, the second element ID 112(2) may represent an IMSI associated with a user 106.

The UE is an example of an element in the form of a physical device that the user uses to access the Internet and/or a mobile phone service. A common example of a UE in today's world is the smart phone, but the UE may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like. UEs are identified to a telecommunications network 108 (e.g., a 5G network) by their IMEIs, which can be obtained by the 5G core (5GC) during various signaling interactions. Hence, the IMEI is another example of an element ID. A UE can be changed legitimately when the UE is lost or stolen, or the user desires to upgrade an old UE to a newer model. A UE used by a user/subscriber can be changed by swapping USIMs as well. In accordance with various embodiments described herein, the terms "user equipment (UE)," "wireless communication device," "wireless device," "communication device," "mobile device," "client device," "electronic device," and "device" may be used interchangeably herein to describe any UE that is capable of transmitting/receiving data wirelessly using any suitable wireless communications/data technology, protocol, or standard, such as those described elsewhere herein. In the example of FIG. 1, the third element ID 112(3) may represent an IMEI associated with a user 106.

In some examples, the enterprise system 102 depicted in FIG. 1 may interact with the network node(s) 110(1) (e.g., the IVF) to obtain a report of an association (or binding) between the elements IDs 112 associated with a given user 106 of the enterprise 104, such as a binding between a MSISDN, an IMSI, and an IMEI associated with a particular user 106. The report obtained by the enterprise system 102 from the service 112 may be in the form of a token 114, which will be described in more detail below. The token 114 obtained by the enterprise system 102 allows the enterprise 104 to establish a baseline for the user 106. Additionally, or alternatively, the token 114 allows the enterprise 104, among other things, to be notified (or informed) if and when there is a change to an element ID(s) 112 associated with the user 106. Additionally, or alternatively, the token 114 is usable in a token-based MFA scheme, as described in more detail below. As preconditions to obtaining the report from the service 112 for subsequently identifying changes in the association (binding) between some or all the key elements IDs 112 described herein, the enterprise 104 has to have knowledge (or otherwise be in possession) of at least one or more of the key element IDs 112 described herein. The enterprise 104 may also specify or configure which key element binding(s) the enterprise 104 wants to track, monitor, or otherwise obtain information about.

In the example of FIG. 1, in order to establish a baseline, the enterprise system 102 issues a request to obtain the binding of key element IDs 112 associated with a particular user 106. For example, the enterprise system 102 may send a first element ID 112(1) to the network node(s) 110(1) (e.g., to the IVF of the 5GC) to make this request. Accordingly, the network node 110(1) receives, from the enterprise system 102, the first element ID 112(1) associated with the user 106, as depicted in FIG. 1. As noted above, an example of the first element ID 112(1) may be a MSISDN, which identifies a phone number (an example of an element) associated with the user 106. The user 106 may have furnished their phone number to the enterprise 104 voluntarily or as a condition of their employment, which is how the first element ID 112(1) may be known to the enterprise 104 or otherwise in the possession of the enterprises 104.

The network node(s) 110(1) may validate the first element ID 112(1) that it received from the enterprise system 102. For example, the network node(s) 110(1) may verify that the first element ID 112(1) is valid (e.g. if the first element ID 112(1) represents a MSISDN, the network node(s) 110(1) may validate the first element ID 112(1) by confirming that the phone number corresponding to the MSISDN has not been ported to another operator and/or that an IMEI associated with the MSISDN has not been reported lost or stolen, etc.). If the network node(s) 110(1) is unsuccessful in validating the first element ID 112(1), the enterprise 104 may be notified that the first element ID 112(1) could not be validated.

If, on the other hand, the first element ID 112(1) is successfully validated, a collector component 116 (or "collector 116") of the network node 110(1) may obtain, from one or more other network nodes 110(2)-(N) of the telecommunications network 108, one or more additional element IDs 112 associated with the first element ID 112(1) and/or with the user 106. For example, the network node(s) 110(1) may send a request 118 to the other network node(s) 110(2)-(N) (e.g., a UPF) via one or more APIs to collect or obtain the current element IDs 112 associated with the first element ID 112(1) and/or with the user 106. The "current" element IDs 112, as used herein, means the element IDs 112 that were obtained by the network node(s) 110(2)-(N) the last time the telecommunications network 108 (e.g., the 5GC) was accessed by a UE associated with the user 106. In some examples, the collector 116 may also obtain a timestamp corresponding to the time of the last known access associated with the relevant key elements. FIG. 1 shows an example where the collector 116 obtains at least a second element ID 112(2) and a third element ID 112(3). In an illustrative example, the second element ID 112(2) in FIG. 1 may represent an IMSI that identifies a USIM associated with the user 106, and the third element ID 112(3) in FIG. 1 may represent an IMEI that identifies a UE associated with the user 106.

With the collected element IDs 112, the network node(s) 110(1) has in its possession an association (or binding) between multiple element IDs 112 associated with the user 106, and this association (or binding) between the element IDs 112 can be used to generate a token 114 that is to be associated with the user 106. Accordingly, a token generator 120 of the network node 110(1) may generate a token 114 based at least in part on the enterprise-provided first element ID 112(1) and based on the one or more additional element IDs 112 obtained from the one or more other network nodes 110(2)-(N) of the telecommunications network 108. Accordingly, the token 114 may represent the association (or binding) between the multiple element IDs 112, such as the first, second, and third element IDs 112(1)-(3). In some examples, the token 114 is generated in the form of a hash value using a hash function. In other words, the token 114 may be a hash of the key element IDs 112. For example, the token generator 120 may provide, as input to a hash function, the multiple element IDs 112, such as the first, second, and third element IDs 112(1)-(3), and the hash function may generate, as output, a hash value as the token 114. In some examples, such a hash function is a cryptographic hash function, or a one-way function, which may be based on public key infrastructure (PKI) techniques. A cryptographic hash function may be used to obscure private information associated with the user 106 so that the service 112 does not provide the enterprise 104 with such private information, and, hence, anonymity of the user 106 is preserved. It is to be appreciated, however, that the token 114 may be generated as an unsecure hash, in some examples, perhaps after receiving authorization and/or consent from users 106 to use their private information in this manner.

As depicted in FIG. 1, the network node(s) 110(1) may send the token 114 to the enterprise system 102 in response to the enterprise system 102 sending the first element ID 112(1) to the network node(s) 110(1). In some examples, the network node(s) 110(1) may send additional information to the enterprise system 102 in addition to the token 114. For example, the network node(s) 110(1) may send, to the enterprise system 102, history information associated with the binding between the element IDs 112. In an example, this history information may include a timestamp indicating a time at which the binding was last "seen" by the network 108 (e.g., the 5GC) and/or a time of the last known access by the key elements identified by the element IDs 112 represented by the token 114. In some examples, the history information may include an age of the association (or binding) between the element IDs 112, such as a time period since a time at which the binding was first "seen" by the network 108. In some examples, the history information may include information as to whether the association (or binding) between the element IDs 112 was first seen at a time at which the token 114 was generated.

The enterprise system 102 may store the token 114 (and any additional information) received from the network node(s) 110(1) in association with the user 106. For example, the enterprise system 102 may maintain a database (or datastore) of user data 122, which may include, among other data, the last (or most recent) token 114 that was received from the network node(s) 110(1), possibly previously-received tokens 114, and possibly the additional information described herein, such as the history information (e.g., timestamps, etc.) noted above. With the newly-received token 114 (and any additional information), the enterprise 104 can establish a baseline security profile for the user 106. Such a baseline security profile may be based on an internal risk model for using SMS as an authentication factor in MFA, and it may indicate the level of trust in using SMS as an authentication factor for MFA of the user 106.

More details regarding the use of the token 114 (or a subsequently-generated token) in a token-based MFA scheme are provided below with reference to the following figures. In short, with continued reference to FIG. 1, the network node(s) 110(1), as part of the security risk assessment service 112, may include a MFA component 124 that is configured to implement a token-based MFA scheme, as described herein. Part of this token-based MFA scheme may be to filter SMS messages used in MFA using a SMS filter 126. This filtering of SMS messages may involve refraining from sending SMS messages for MFA of a user 106 when a token mismatch is encountered, as described in more detail below.

Figure 2:
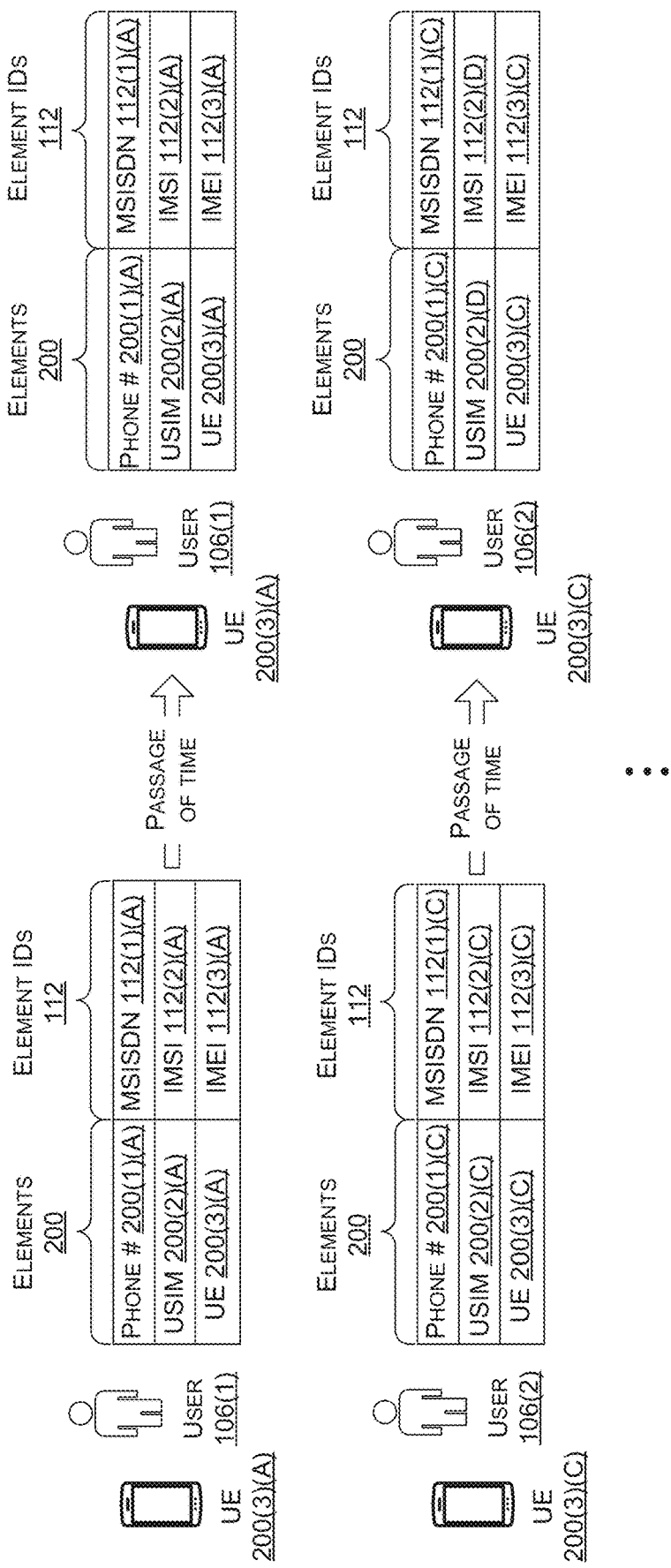
FIG. 2 is a diagram illustrating example element identifiers and corresponding elements that may be associated with users associated with an enterprise, as well as how one or more of the element identifiers can potentially change over time.

FIG. 2 is a diagram illustrating example element IDs 112 and corresponding elements 200 that may be associated with users 106 associated with an enterprise 104, as well as how one or more of the element IDs 112 can potentially change over time. In the example of FIG. 2, a first user 106(1) is associated with elements 200 including, without limitation, a phone number 200(1)(A), a USIM 200(2)(A), and a UE 200(3)(A). These three example elements 200(1)(A)-(3)(A) are respectively identified by element IDs 112 that include, without limitation, a MSISDN 112(1)(A), an IMSI 112(2)(A), and an IMEI 112(3)(A). FIG. 2 illustrates that the elements 200 and the IDs 112 of those elements 200 do not change over the passage of time, which may represent any suitable time period (e.g., a day, a week, a month, etc.).

In FIG. 2, a second user 106(2) is associated with elements 200 and element IDs 112 as well. At first instance in time, the second user 106(2) is associated with elements 200 including, without limitation, a phone number 200(1)(C), a USIM 200(2)(C), and a UE 200(3)(C). These three example elements 200(1)(C)-(3)(C) are respectively identified by element IDs 112 that include, without limitation, a MSISDN 112(1)(C), an IMSI 112(2)(C), and an IMEI 112(3)(C). Over the passage of time, one or more elements 200 and/or element IDs 112 associated with the second user 106(2) have changed, as illustrated in FIG. 2. For example, the USIM associated with the second user 106(2) changed from USIM 200(2)(C) to USIM 200(2)(D) at a second instance in time after the first instance in time. Accordingly, the IMSI that identifies the USIM of the second user 106(2) also changed from IMSI 112(2)(C) to IMSI 112(2)(D). This change may represent a legitimate change caused by the user 106(2), or it may have changed as a result of an attacker employing a targeted attack strategy against the user 106(2). For example, an attacker may have succeeded in a SIM Swap attack, as described herein. Regardless of the origin of the change, this type of change to an element ID 112 is detectable by the security risk assessment service 112, as described in more detail below.

Figure 3:
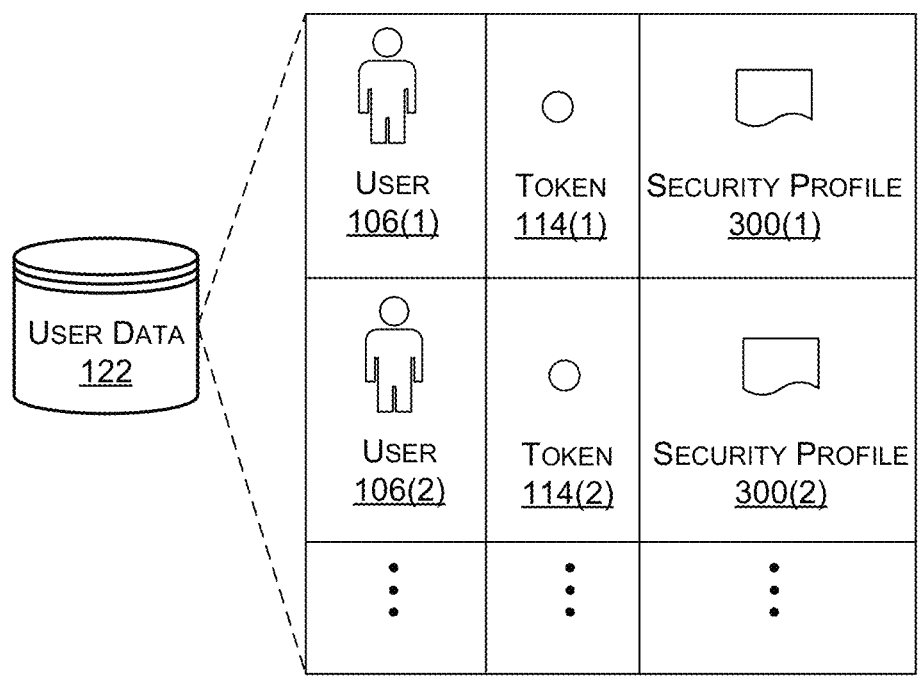
FIG. 3 illustrates example user data that may be maintained by an enterprise, the user data associating tokens and security profiles with users associated with the enterprise.

FIG. 3 illustrates example user data 122 that may be maintained by an enterprise 104, the user data 122 associating tokens 114 and security profiles 300 with users 106 associated with the enterprise 104. With reference to FIG. 1, it was described how an enterprise 104 may obtain a token 114 that is representative of an association (or binding) between the elements IDs 112 associated with a given user 106. It was also described how the enterprise system 102 may store the tokens 114 received from the network node(s) 110(1) that is/are implementing the security risk assessment service 112. As tokens 114 are generated by the token generator 120 and sent to the enterprise system 102, the tokens 114 (and additional information, such as history information) may be stored in association with users 106, such as in a database (or datastore) of user data 122. Accordingly, the user data 122 illustrated in FIG. 3 is shown as including a first user 106(1) and a first token 114(1) associated therewith, a second user 106(2) and a second token 114(2) associated therewith, and so on and so forth for any number of users 106. The tokens 114 may represent the latest (or most recent) tokens 114 generated for the users 106. It is to be appreciated, however, that the user data 122 may include multiple tokens 114 associated with an individual user 106, such as any number of previously-generated tokens 114 that were generated before the latest (or most recent) token 114. Accordingly, as new tokens 114 are received by the enterprise system 102, the new tokens 114 may be stored in the user data 122. In some examples, previously-generated (e.g., old or stale) tokens 114 may be deleted. If previously-generated tokens 114 are retained in the user data 122, they may be labeled as "old" or any similar label to indicate that there is a newer token 114 associated with a given user 106.

FIG. 3 also illustrates security profiles 300 that may be stored in the user data 122 in association with the users 106. For example, a first security profile 300(1) may be associated with the first user 106(1), a second security profile 300(2) may be associated with the second user 106(2), and so on and so forth. The security profile 300 associated with a given user 106 is indicative of the level of trust in using SMS as an authentication factor for MFA of that user 106. Referring again to the example of FIG. 2, where an element ID 112 (e.g., the IMSI 112(2)(C)/(D)) associated with the second user 106(2) changed over time, when the security risk assessment service 112 detected such a change to the element ID 112 of the second user 106(2), the security profile 300(2) may have been adjusted (e.g., reduced) to indicate a lower level of trust in using SMS as an authentication factor for MFA of the second user 106(2).

Figure 4:
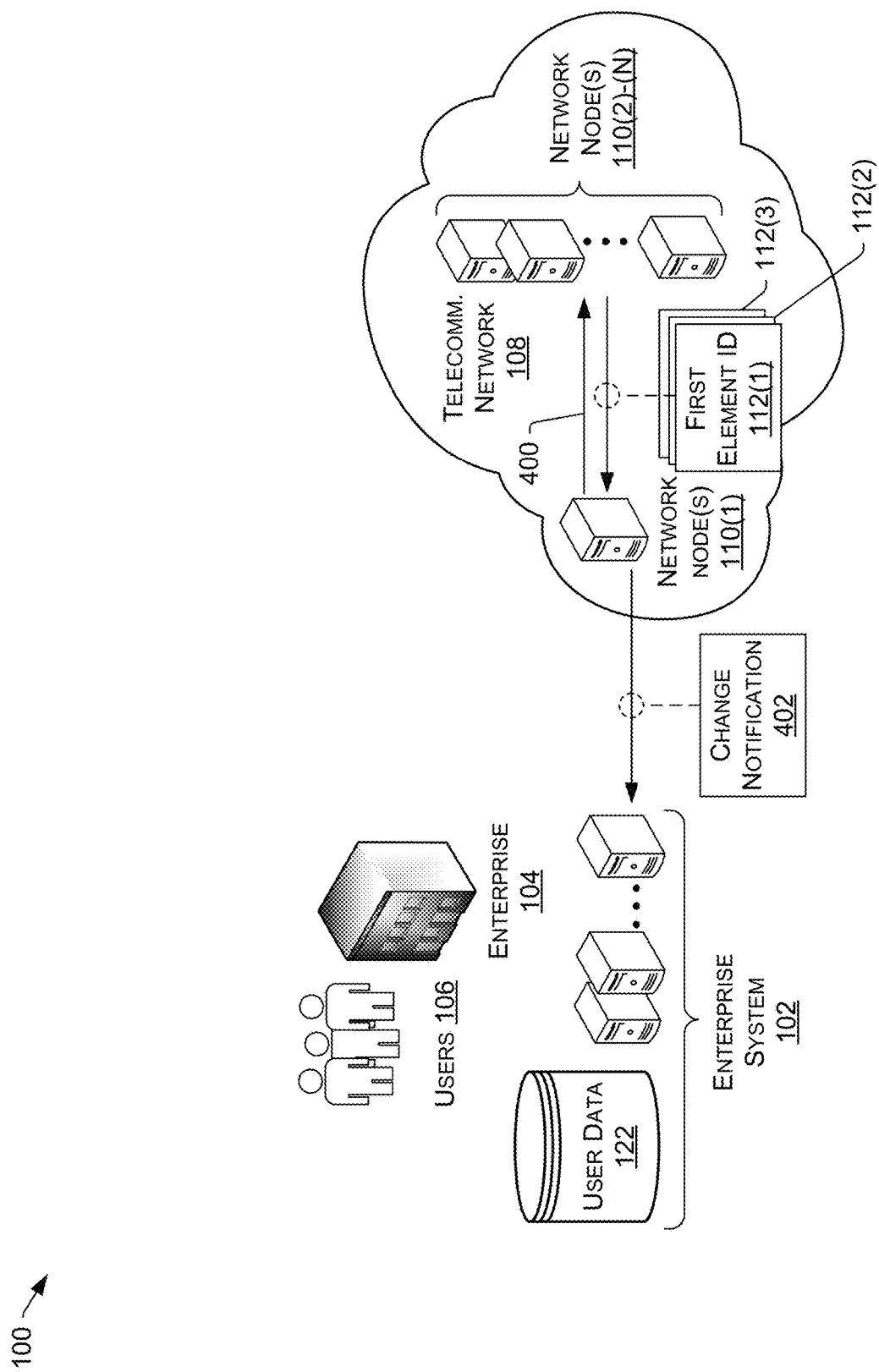
FIG. 4 illustrates a technique for notifying an enterprise of a change to one or more element identifiers associated with a user, according to various embodiments.

FIG. 4 illustrates a technique for notifying an enterprise 104 of a change to one or more element IDs 112 associated with a user 106, according to various embodiments. When the enterprise 104 wants to get information regarding any changes to the association (or binding) of key element IDs 112 for a given user 106, such as a change to the IMSI associated with a user 106 (e.g., due to a SIM Swap attack), the enterprise 104 can periodically poll the network node(s) 110(1) (e.g., the IVF), and/or the enterprise 104 can subscribe to be notified when there is such a change.

In the polling approach, the enterprise system 102 can poll the network node(s) 110(1) on a periodic basis (e.g., at fixed intervals), based on an event, and/or on demand (e.g., at the initiative of the enterprise 104). For example, the network node(s) 110(1) may receive, from the enterprise system 102, a request to determine whether one or more of the element IDs 112 associated with a user 106 have changed since the last token 114 was generated. In response to receiving this request, the network node(s) 110(1) may obtain the current element IDs 112 associated with the user 106 (e.g., the element IDs 112 last "seen" by the network 108) from the one or more other network nodes 110(2)-(N), such as by the collector 116 issuing a request 400 for the current element IDs 112. In the example of FIG. 4, the other network node(s) 110(2)-(N) return(s) the first element ID 112(1), the second element ID 112(2), and the third element ID 112(3), which may represent a MSISDN, an IMSI, and an IMEI, respectively. It is to be appreciated, however, that fewer or greater than three element IDs 112 may be returned in response to the request 400. The token generator 120 may generate a token 114 based at least in part on the current element IDs 112 obtained by the collector 116, and may compare the token 114 to a previously-generated token 114. The network node(s) 110(1) may retain tokens 114 that it has generated for users 106 associated with the enterprise 104 to perform this comparison, or the enterprise system 102 may provide the previously-generated token 114 to the network node(s) 110(1). If the tokens 114 are the same (e.g., if the newly-generated token 114 matches the previously-generated token 114), then the use of SMS as an authentication factor in MFA can be trusted, and the current security profile 300 associated with the user 106 can remain unchanged, or it can increase to a higher trust level (save for any other security policy considerations). If the tokens 114 are different (e.g., if the newly-generated token 114 does not match the previously-generated token 114), then the network node(s) 110(1) may send, to the enterprise system 102, a notification 402 that at least one of the element ID 112 associated with the user 106 has changed since the previously-generated token 114 was generated. This is labeled as a "change notification 402" in FIG. 4. In some examples, the network node(s) 110(1) may send additional change information to the enterprise system 102, such as information that specifies which element ID(s) 112 has/have changed, and/or information that specifies a time (e.g., a number of days) since the last known access of the network 108 with the binding that is represented by the newly-generated token 114, or any other information that may be informative and/or useful to the enterprise 104. The enterprise 104 can then make a risk assessment as to the level of suspicion due to the detected change, such as by adjusting (e.g., reducing) the security profile 300 associated with the user 106.

In some examples, different combinations of key element ID 112 changes can be factored into a risk posture that the enterprise 104 takes toward the user 106. For example, if the IMSI changed, the enterprise 104 may have little-to-no confidence that using SMS in MFA would be secure for the user 106 in question. However, if the IMEI changed, perhaps the enterprise 104 may have a medium level of confidence that using SMS in MFA is sufficiently secure with respect to the user 106 in question. If two out of three element IDs 112 changed, this may have a greater impact on the security profile 300 associated with the user 106 than if one out of the three element IDs 112 changed. These are merely examples, and it is to be appreciated that an enterprise 104 can implement its own security model in a proprietary fashion.

In the subscription approach, the enterprise 104 may subscribe to be notified when there is a change to the association (or binding) of key element IDs 112 for a given user 106. A change may be detected by the token generator 120 generating a new token 114 on a periodic basis (e.g., at a fixed interval), at random, or in response to an event, and comparing the newly-generated token 114 to the previously-generated token 114 that it has retained for the enterprise 104. When there is a change (e.g., based on a token mismatch), the network node(s) 110(1) may send, to the enterprise system 102, a notification 402 that at least one of the element ID 112 associated with the user 106 has changed since the previously-generated token 114 was generated. In some examples, the network node(s) 110(1) may send additional change information to the enterprise system 102, such as information that specifies which element ID(s) 112 has/have changed, and/or information that specifies a time (e.g., a number of days) since the last known access of the network 108 with the binding that is represented by the newly-generated token 114, or any other information that may be informative and/or useful to the enterprise 104. In some examples, the network node(s) 110(1) may send, to the enterprise system 102, the newly-generated token 114, and/or the additional change information noted above. The enterprise 104, upon receiving a notification 402 of change (possibly along with additional change information, the newly-generated token 114, etc.), can then make a risk assessment as to the level of suspicion due to the detected change, such as by adjusting (e.g., reducing) the security profile 300 associated with the user 106.

Figure 5:
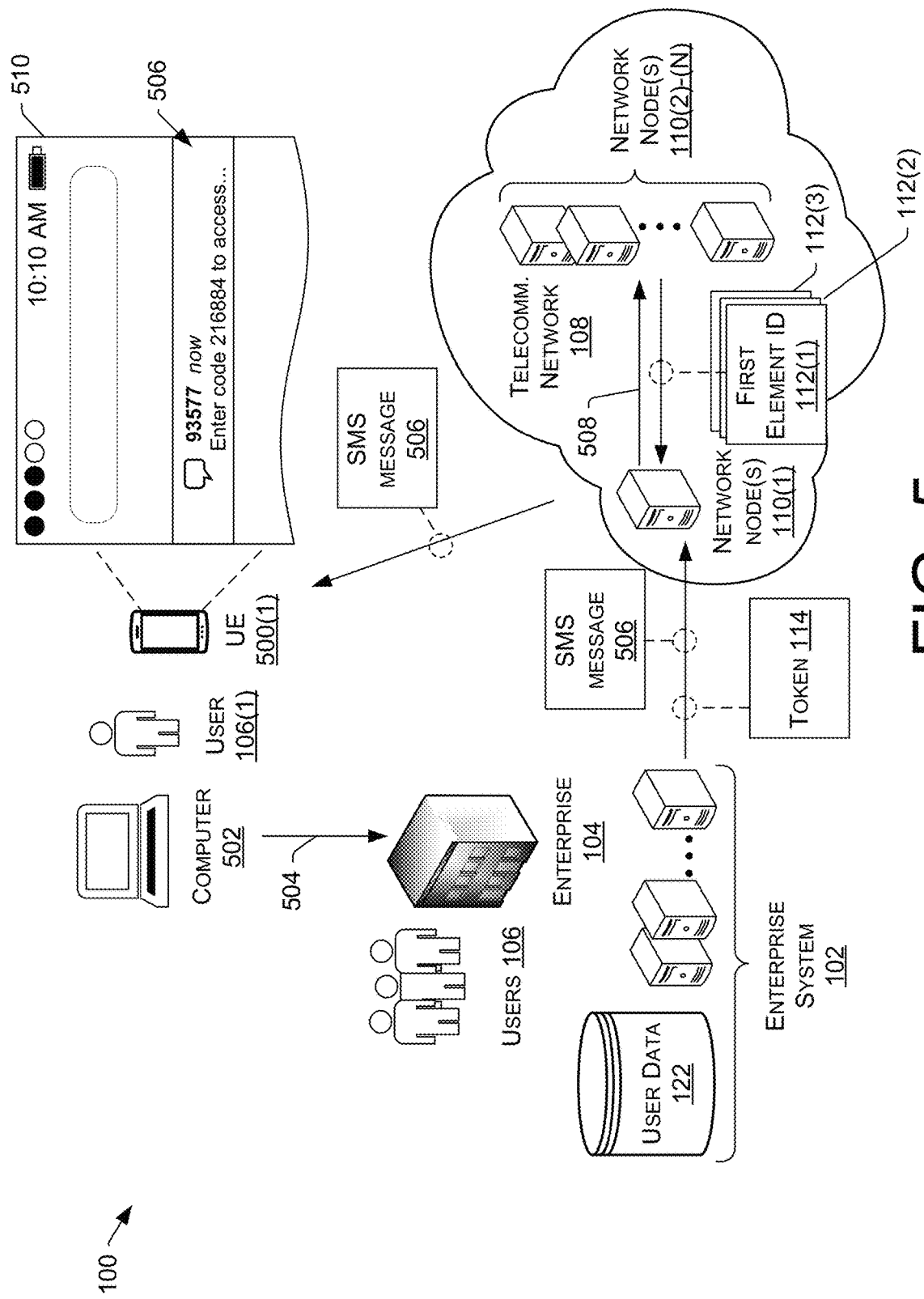
FIG. 5 illustrates a technique for authenticating a user associated with an enterprise using a token-based MFA scheme where SMS is used as an authentication factor, according to various embodiments.

FIG. 5 illustrates a technique for authenticating a user 106(1) of an enterprise 104 using a token-based MFA scheme where SMS is used as an authentication factor, according to various embodiments. In an illustrative example, a user 106(1) of the enterprise 104 may attempt to access enterprise resources (e.g., computers, data, etc.) remotely using a computer 502, which may be a personal computer, an enterprise-issued computer, or the like, which the user 106(1) uses to access enterprise resources while away from the office. In other words, the user 106(1) may be off-premise, such as while working remotely from home, at a coffee shop, at a library, or any other remote location. The user 106(1) may enter credentials (e.g., a username and/or a password) that are sent by the computer 502 to the enterprise system 102 as part of a request 504 to login to the enterprise system 102 remotely. This request 504 (e.g., login attempt) may trigger a token-based MFA procedure that is used to authenticate the user 106(1) before the user 106(1) is granted access to enterprise resources.

For example, in response to receiving the request 504 from the computer 502 of the user 106(1), the enterprise system 102 may send, to the network node(s) 110(1) (e.g., the IVF) (i) a SMS message 506 for use in authenticating the user using MFA, and (ii) a first token 114. The first token 114 represents the latest (most recent) token 114 that the enterprise system 102 received from the network node(s) 110(1). The enterprise system 102 may retrieve the first token 114 from the user data 122 by looking up an ID of the user 106(1) who is trying to access enterprise resources remotely. The SMS message 506 may include authentication information or contents, such as a code, a one-time password (OTP), a unique Uniform Resource Locator (URL), etc., which is to be used by the user 106(1) upon receipt of the SMS message 506 as part of a MFA procedure to authenticate the user 106(1). In some examples, the enterprise system 102 sends, to the network node(s) 110(1), a validity time period associated with the SMS message 506 and/or a validity time period associated with the authentication information/contents carried by the SMS message 506, which informs the MFA component 124 how long to wait for a UE 500(1) of the user 106(1) to become reachable, if the UE 500(1) is initially unreachable. In some examples, the validity time period may be omitted, or it may be set to an infinite amount of time (e.g., no timeout). This "inactive" UE 500(1) scenario is described in more detail below.

Upon receiving the SMS message 506 and the first token 114 from the enterprise system 102, the network node(s) 110(1) may obtain current element IDs 112 associated with the user 106(1) from the one or more other network nodes 110(2)-(N). For example, the collector 116 may issue a request 508 to the other network node(s) 110(2)-(N) for the current element IDs 112 associated with the user 106(1). In some examples, such a request 508 includes an ID(s) of the user 106(1), which may include one or more of the element IDs 112 last known to the network node(s) 110(1). In the example of FIG. 5, the other network node(s) 110(2)-(N) return(s) a first element ID 112(1), a second element ID 112(2), and a third element ID 112(3), which may represent a MSISDN, an IMSI, and an IMEI, respectively. It is to be appreciated, however, that fewer or greater than three element IDs 112 may be returned in response to the request 508. The token generator 120 may then generate a second token 114 based at least in part on the current element IDs 112 obtained by the collector 116 from the other network node(s) 110(2)-(N), and the network node(s) 110(1) (e.g., the MFA component 124) may compare the second token 114 to the enterprise-provided, first token 114. If the tokens 114 are the same (e.g., if the second token 114 matches the enterprise-provided, first token 114), then the network node(s) 110(1) may send the SMS message 506 to a UE 500(1) of the user 106(1). This "release" of the SMS message 506 is based on the notion that the use of SMS as an authentication factor in MFA can be trusted if the key element IDs 112 have not changed for the user 106(1) over a passage of time (e.g., at least since the enterprise-provided first token 114 was generated). FIG. 5 illustrates a user interface 510 that may be presented on a display of the UE 500(1), the user interface 510 including a visual representation of the SMS message 506 received by the UE 500(1) based on the sequentially-generated tokens 114 matching each other. As illustrated in FIG. 5, the SMS message 506 presented in the user interface 510 prompts the user 106(1) to enter a code via the computer 502 in order to authenticate using MFA, and to access the enterprise resources remotely once authenticated. In addition, the network node(s) 110(1) may send, to the enterprise system 102, a notification (e.g., confirmation) that the SMS message 506 was sent to the UE 500(1) of the user 106(1) based on the tokens 114 matching each other (i.e., no change to the element IDs 112 since the last token 114 was generated), and/or the network node(s) 110(1) may send the latest token 114 (e.g., the second token 114) to the enterprise system 102. In some examples, the network node(s) 110(1)

sends, to the enterprise system 102, a timestamp of the last known network 108 (e.g., 5GC) access with the element ID binding represented by the latest token 114 (e.g., the second token 114).

If the UE 500(1) is active (e.g., currently registered with the telecommunications network 108 (e.g., 5GC) for IMS-based services), the UE 500(1) is reachable by the network node(s) 110(1), and, therefore, the SMS message 506 can be sent immediately based on the sequentially-generated tokens 114 matching each other (i.e., based on the second token 114 matching the enterprise-provided, first token 114). If the network node(s) 110(1) determines that the UE 500(1) is unreachable (e.g., if the UE 500(1) is powered off or otherwise not currently registered with the telecommunications network 108, such as out of radio coverage), the network node(s) 110(1) (e.g., the MFA component 124) may wait a period of time for the UE 500(1) to become reachable (e.g., for the user 106(1) to power on the UE 500(1) and/or for the UE 500(1) to register with the network 108). This period of time that the network node(s) 110(1) waits may correspond to a timeout for authenticating the user 106(1) using MFA for the particular login attempt and/or the particular SMS message 506. While waiting for the timeout to occur, the network node(s) 110(1) may send, to the enterprise system 102, a notification that the enterprise-provided first token 114 is valid, but that the UE 500(1) is currently unreachable and that delivery of the SMS message 506 will be attempted later. If the period of time expires because the UE 500(1) remains unreachable after a lapse (or expiration) of the period of time, the network node(s) 110(1) (e.g., the MFA component 124) may abort the MFA procedure with respect to the user 106(1), and the enterprise 104 may be notified accordingly.

If the UE 500(1) becomes reachable prior to a lapse of the period of time, the network node(s) 110(1) is configured to repeat the procedure described above to generate a new (third) token 114 before releasing the SMS message 506. That is, the network node(s) 110(1) (e.g., the collector 116) may "refresh" the element IDs 112 by obtaining new current element IDs 112 associated with the user 106(1) from the one or more other network nodes 110(2)-(N), and the token generator 120 may then generate a third token 114 based at least in part on the new current element IDs 112 as part of a "re-verification" procedure. This is to guard against a scenario where one or more of the element IDs 112 change during the interval between the generation of the second token 114 and the UE 500(1) becoming reachable (e.g., coming back online, registering with the network 108, etc.). Upon comparing the third token 114 to the previously-generated second token 114, if the tokens 114 are the same (e.g., if the new third token 114 matches the previously-generated second token 114), then the network node(s) 110(1) (e.g., the MFA component 124) may send the SMS message 506 to a UE 500(1) of the user 106(1). In addition, the network node(s) 110(1) may send, to the enterprise system 102, a notification (e.g., confirmation) that the SMS message 506 was sent to the UE 500(1) of the user 106(1) based on the tokens 114 matching each other (i.e., no change to the element IDs 112 since the last token 114 was generated), and/or the network node(s) 110(1) may send the latest token 114 (e.g., the third token 114) to the enterprise system 102. In some examples, the network node(s) 110(1) sends, to the enterprise system 102, a timestamp of the last known network 108 (e.g., 5GC) access with the element ID binding represented by the latest token 114 (e.g., the third token 114).

In any of these scenarios (e.g., an active UE 500(1), an inactive UE 500(1) that subsequently becomes active/reachable within the timeout period, etc.), the comparison of sequentially-generated tokens 114 may result in a token mismatch, which indicates that the binding between the element IDs 112 of the user 106(1) has changed since the last token 114 was generated. This could have been caused by the user 106(1) making a legitimate change (e.g., buying a new phone, local number porting, etc.), or it could have been caused by an attacker implementing an attack strategy, such as a SIM Swap attack. In the case of a token mismatch (e.g., if the second token 114 does not match the enterprise-provided first token 114, if the third token 114 does not match the previously-generated, second token 114 after the UE 500(1) becomes reachable, etc.), the network node(s) 110(1) can take one or more actions. One action may be for the network node(s) 110(1) (e.g., the SMS filter 126) to refrain from sending the SMS message 506 to the UE 500(1) of the user 106(1) based on the token mismatch. In addition, the network node(s) 110(1) may send, to the enterprise system 102, a notification that the SMS message 506 was not sent to the UE 500(1) of the user 106(1) based on one of the element IDs 112 having changed since the previous token 114 (e.g., first token 114, second token 114, etc.) was generated, and/or the network node(s) 110(1) may send the latest token 114 (e.g., second token 114, third token 114, etc.) to the enterprise system 102. In some examples, the network node(s) 110(1) sends, to the enterprise system 102, a timestamp of the last known network 108 (e.g., 5GC) access with the element ID binding represented by the latest token 114. Another example action taken by the network node(s) 110(1) may be to implement one or more additional authentication procedures in the case of a token mismatch, such as requesting the user 106(1) to provide biometric information (e.g., a fingerprint, iris scan, voice verification, etc.) to authenticate the user 106(1) using something other than a SMS-based MFA procedure. In some examples, the network node(s) 110(1) may send, to the enterprise system 102, a notification similar to the notification 402 described with reference to FIG. 4 (e.g., a change notification 402) and/or additional change information, such as information that specifies which element ID(s) 112 has/have changed, etc.

The enterprise 104 can then make a risk assessment based on the notification and/or information received by the enterprise system 102 from the network node(s) 110(1), such as by adjusting (e.g., reducing or increasing) the security profile 300 associated with the user 106(1). For example, if the enterprise system 102 receives a notification that the SMS message 506 was not sent to the UE 500(1) of the user 106(1), the enterprise 104 can reduce the security profile 300 associated with the user 106(1) to indicate a lower confidence, and/or lower trust level in using SMS for MFA with respect to the particular user 106(1). In some examples, the enterprise 104 can determine to use other authentication mechanisms for the user 106(1) (e.g., authentication procedures that are more secure than an SMS-based MFA procedure, even if it comes at a cost of being less convenient).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 6:
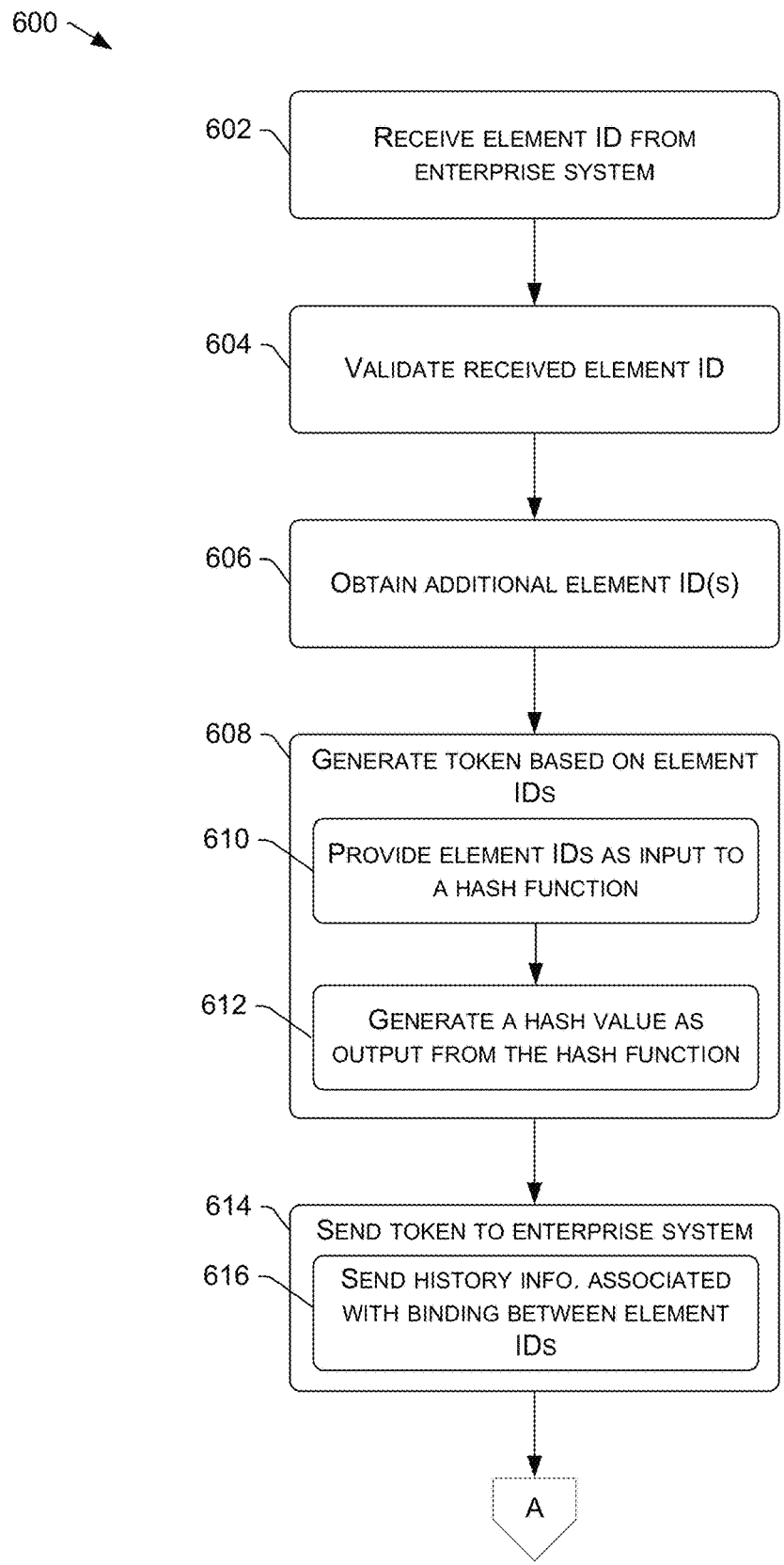
FIG. 6 illustrates a flowchart of an example process for generating a token for an enterprise, the token representing an association between element identifiers associated with a user associated with an enterprise, according to various embodiments.

FIG. 6 illustrates a flowchart of an example process 600 for generating a token 114 for an enterprise 104, the token 114 representing an association between element IDs 112 associated with a user 106 associated with an enterprise 104, according to various embodiments. The process 600 is described with reference to the previous figures.

At 602, a network node 110(1) (e.g., an IVF) of a telecommunications network 108 may receive, from an enterprise system 102, an ID 112(1) of a first element 200 associated with a user 106 associated with an enterprise 104 associated with the enterprise system 102. For example, the ID 112(1) of the first element 200 may include a MSISDN, and the first element 200 may include a phone number 200(1).

At 604, the network node 110(1) may validate the ID 112(1) of the first element 200. For example, the network node(s) 110(1) may verify that the ID 112(1) is valid (e.g. if the ID 112(1) represents a MSISDN, the network node(s) 110(1) may validate the element ID 112(1) by confirming that the phone number 200(1) corresponding to the MSISDN has not been ported to another operator and/or that an IMEI associated with the MSISDN has not been reported lost or stolen). It is to be appreciated that, if the network node(s) 110(1) is unsuccessful in validating the ID 112(1), the enterprise 104 may be notified that the ID 112(1) could not be validated. The process 600 is an example process where the validation of the ID 112(1) is successful at block 604.

At 606, the network node 110(1) may obtain, from one or more other network nodes 110(2)-(N) of the telecommunications network 108, and based at least in part on validating the ID 112(1) of the first element 200, an ID 112(2) of at least second element 200 associated with the user 106. For example, the ID 112(2) of the second element may include an IMSI, and the second element 200 may include a USIM 200(2). In some examples, multiple additional IDs 112 may be obtained at block 606. For example, in addition to obtaining the ID 112(2), the network node 110(1) may obtain an ID 112(3) of a third element 200 associated with the user 106. The ID 112(3) of the third element 200 may include an IMEI, and the third element 200 may include a UE 200(3). It is to be appreciated that the element ID 112 received at block 602, and the element ID(s) obtained at block 606 may be any of the IDs 112 described herein, and that any number of additional element ID(s) may be obtained at block 606.

At 608, the network node 110(1) may generate a token 114 based at least in part on the ID 112(1) of the first element 200 received at block 602, and the additional element ID(s) 112 obtained at block 606, such as the ID 112(2) of the second element 200 and/or the ID 112(3) of the third element 200. As shown in FIG. 6, generating the token 114 at block 608 may include one or more sub-operations. For example, at sub-block 610, the network node 110(1) (e.g., the token generator 120) may provide, as input to a hash function, the ID 112(1) of the first element 200 received at block 602, and the additional element ID(s) 112 obtained at block 606, such as the ID 112(2) of the second element 200 and/or the ID 112(3) of the third element 112(3). At sub-block 612, the network node 110(1) (e.g., the token generator 120) may generate, as output from the hash function, a hash value as the token 114. In some examples, the hash function is a cryptographic hash function, such as a one-way function, which allows for obscuring private/sensitive information such that it is not revealed to the enterprise 104 who is to receive the token 114, and/or from other third party entities (e.g., attackers, hackers, etc.). In some examples, the token 114 represents an association (or binding) between the IDs 112 used to generate the token 114, such as any two or more IDs 112 amongst the ID 112(1) of the first element 200, the ID 112(2) of the second element 200, and the ID 112(3) of the third element 200.

At 614, the network node 110(1) may send the token 114 to the enterprise system 102. At sub-block 616, the network node 110(1) may send, to the enterprise system 102, history information associated with the binding between the IDs 112 used to generate the token 114. For example, the history information sent at sub-block 616 may include a timestamp indicating a time at which the binding was last "seen" by the network 108 (e.g., the 5GC) and/or a time of the last known access by the key elements 200 identified by the element IDs 112 represented by the token 114. In some examples, the history information may include an age of the association (or binding) between the element IDs 112, such as a time period since a time at which the binding was first "seen" by the network 108. In some examples, the history information may include information as to whether the association (or binding) between the element IDs 112 was first seen when the token 114 was generated.

By implementing the process 600, a baseline security profile 300 associated with the user 106 may be established, after which, the security risk assessment service 112 can be utilized to determine whether any changes are made to the IDs 112 of the elements 200 that are associated with the user 106. Any changes to the element IDs 112 associated with the user 106 may be factored into an adjustment to the user's security profile 300.

Figure 7:
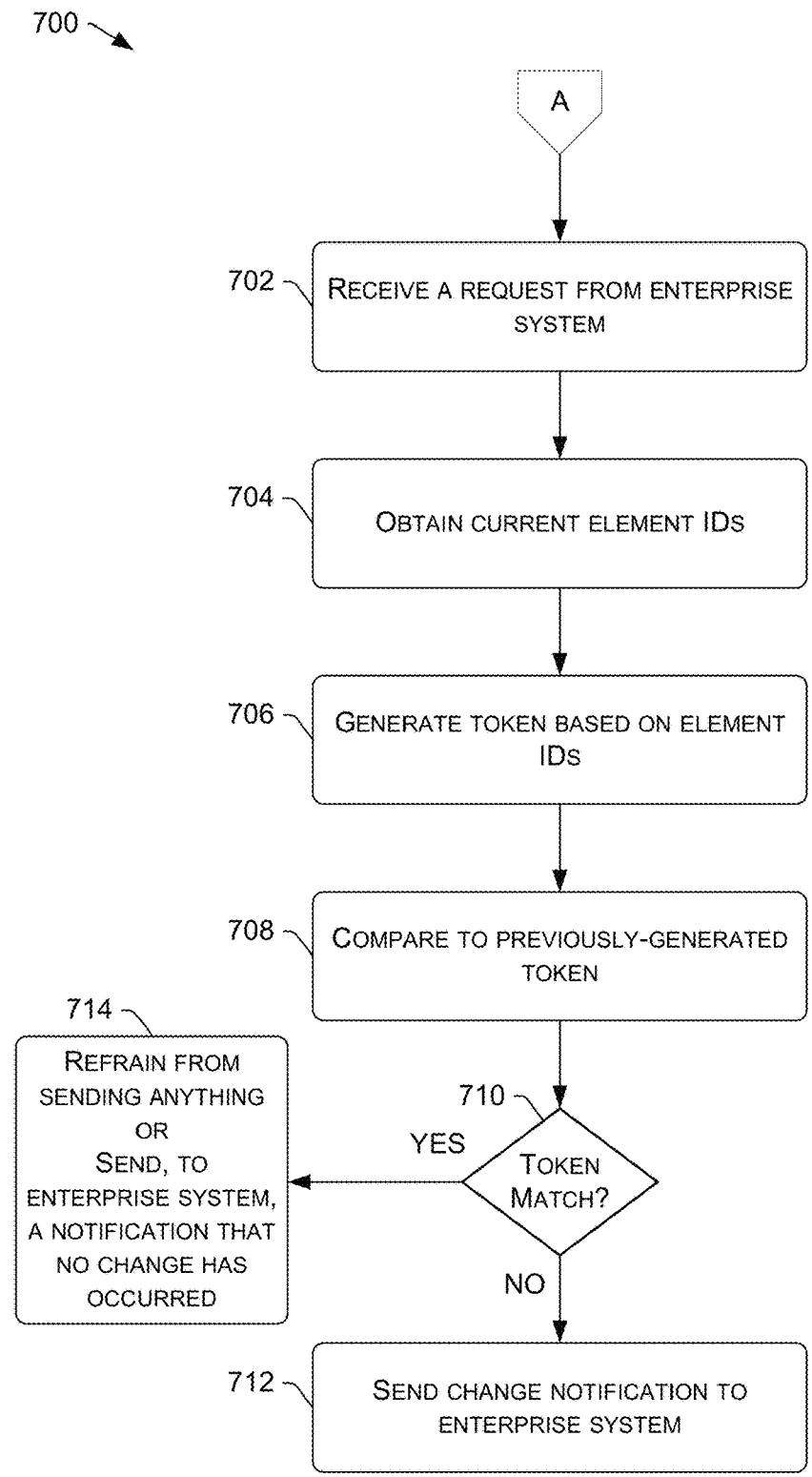
FIG. 7 illustrates a flowchart of an example process for notifying an enterprise of a change to one or more element identifiers associated with a user, according to various embodiments.

FIG. 7 illustrates a flowchart of an example process 700 for notifying an enterprise 104 of a change to one or more element IDs 112 associated with a user 106, according to various embodiments. The process 700 is described with reference to the previous figures. Furthermore, as shown by the off-page reference "A" in FIGS. 6 and 7, the process 700 may continue from block 614 of the process 600.

At 702, the network node 110(1) may receive a request from the enterprise system 102. For example, the request received at block 702 may be a first request to determine whether one or more element IDs 112 associated with a user 106 have changed since the previous token 114 was generated. In other words, the first request may be one of a series of periodic requests made by the enterprise system 102 to check whether any element ID(s) has/have changed with respect to a particular user 106 (or group of users 106). In some examples, the first request includes a first token 114 that the enterprise system 102 most-recently received from the network node 110(1). In another example, the request received at block 702 may be a second request to subscribe to change notifications from the network node 110(1). That is, the enterprise 104 may subscribe to receive change notifications so that it does not have to check on the status of an association between element IDs 112 with respect to a user 106; rather, it can receive notifications if and when anything changes based on the subscription request.

At 704, in response to receiving the request at block 702, the network node(s) 110(1) may obtain, current element IDs 112 from the one or more other network nodes 112(2)-(N), as described herein. For example, the network node(s) 110(1) may issue a request 400 to obtain the current element IDs 112 for a particular user 106 (e.g., a user 106 associated with the request received at block 702). In some examples, the element IDs 112 obtained at block 704 include a MSISDN, an IMSI, and/or an IMEI, which identify respective elements 200 (e.g., a phone number, a USIM, and/or a UE) associated with the user 106.

At 706, the network node(s) 110(1) may generate a second token 114 based at least in part on the current element IDs 112 obtained at block 704. The operation(s) performed at block 706 may be similar to the operation(s) performed at block 608 of the process 600, such as using a hash function to generate the second token 114 by inputting the element IDs 112 to the hash function.

At 708, the network node(s) 110(1) may compare the second token 114 generated at block 706 to a previously-generated token 114 that was most-recently generated based on the last known element IDs 112 associated with the user 106. This previously-generated token 114 may be retrievable from a storage location accessible to the network node 110(1), or it may have been received in a request from the enterprise system 102 at block 702, as noted above.

At 710, based on comparing the tokens 114, the network node(s) 110(1) may determine whether the second token 114 matches the previously-generated first token 114. If the tokens 114 do not match, the process 700 may follow the NO route from block 710 to block 712, where the network node(s) 110(1) may send, to the enterprise system 102, a notification 402 that at least one of element IDs 112 has changed since the first token 114 was generated. In some examples, additional information may be sent at block 712 to the enterprise system 102, such as information indicating which element(s) ID 112 has/have changed. If the tokens 114 match, the process 700 may follow the YES route from block 710 to block 714, where the network node(s) 110(1) may refrain from sending anything (e.g., if the enterprise 104 subscribed to receive change notifications, then nothing may be sent unless and until a change occurs), or the network node(s) 110(1) may send, to the enterprise system 102, a notification that none of the element IDs 112 have changed, and/or that a binding between the element IDs 112 is the same as when the first token 114 was generated, and/or that the tokens 114 match.

Figure 8:
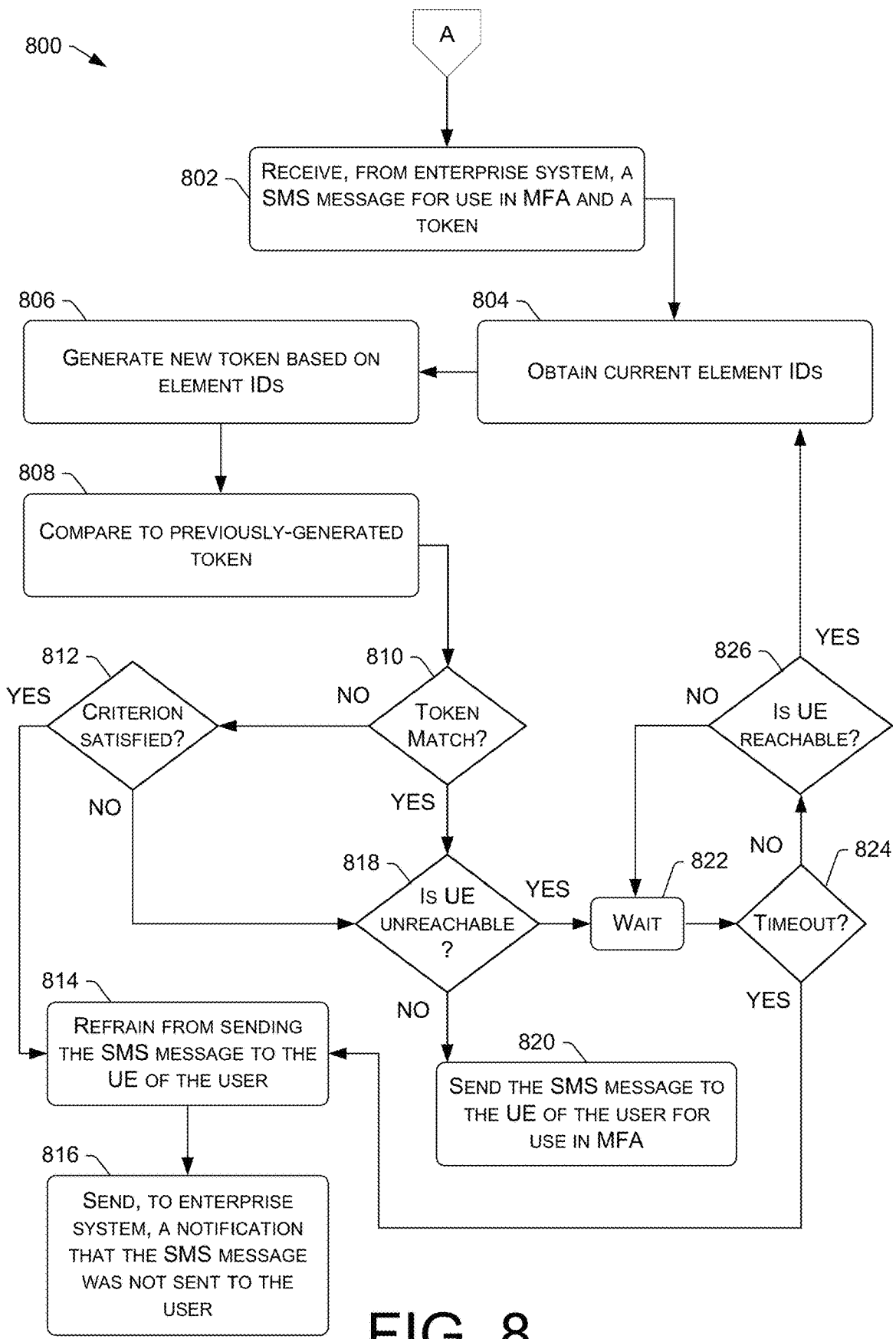
FIG. 8 illustrates a flowchart of an example process for authenticating a user associated with an enterprise using a token-based MFA scheme where SMS is used as an authentication factor, according to various embodiments.

FIG. 8 illustrates a flowchart of an example process 800 for authenticating a user 106 associated with an enterprise 104 using a token-based MFA scheme where SMS is used as an authentication factor, according to various embodiments. The process 800 is described with reference to the previous figures. Furthermore, as shown by the off-page reference "A" in FIGS. 6 and 8, the process 800 may continue from block 614 of the process 600.

At 802, the network node 110(1) may receive, from the enterprise system 102, (i) a SMS message 506 for use in authenticating a user 106(1) using MFA, and (ii) a first token 114, such as the token generated at block 608 of the process 600, or any token generated thereafter, but prior to block 802 of the process 800. In some examples, the network node(s) 110(1) receives, from the enterprise system 102, a validity time period associated with the SMS message 506 and/or the authentication information/contents carried by the SMS message 506, which informs the MFA component 124 how long to wait for a UE 500(1) of the user 106(1) to become reachable, if initially unreachable. In some examples, the validity time period may be omitted or it may be set to an infinite amount of time (e.g., no timeout).

At 804, in response to receiving the SMS message 506 and the first token 114 at block 802, the network node(s) 110(1) may obtain current element IDs 112 from the one or more other network nodes 112(2)-(N), as described herein. For example, the network node(s) 110(1) may issue a request 508 to obtain the current element IDs 112 for the user 106(1) who is to be authenticated. In some examples, the element IDs 112 obtained at block 804 include a MSISDN, an IMSI, and/or an IMEI, which identify respective elements 200 (e.g., a phone number, a USIM, and/or a UE) associated with the user 106(1).

At 806, the network node(s) 110(1) may generate a second token 114 based at least in part on the current element IDs 112 obtained at block 804. The operation(s) performed at block 806 may be similar to the operation(s) performed at block 608 of the process 600, such as using a hash function to generate the second token 114 by inputting the element IDs 112 to the hash function.

At 808, the network node(s) 110(1) may compare the second token 114 generated at block 806 to the first token 114 received at block 802. In this case, the first token 114 received at block 802 represents a previously-generated token 114 that was most-recently generated based on the last known element IDs 112 associated with the user 106(1). This previously-generated token 114 may additionally, or alternatively, be retrievable from a storage location accessible to the network node 110(1).

At 810, based on comparing the tokens 114, the network node(s) 110(1) may determine whether the second token 114 matches the previously-generated first token 114. If the tokens 114 do not match, the process 800 may follow the NO route from block 810 to block 812, where the network node(s) 110(1) may evaluate one or more criteria to determine if the one or more criteria are satisfied. An example criterion is satisfied if a particular element ID 112 or a particular set of element IDs 112 of the element IDs 112 has changed since the first token 114 was generated. For example, if the element IDs 112 used to generate the second token 114 at block 806 include a MSISDN, an IMSI, and an IMEI, the criterion may be satisfied if the IMSI has changed, but the criterion may not be satisfied if the IMSI has not changed, regardless of whether the other element IDs 112 (e.g., the MSISDN and the IMEI) have changed or not. In another example, the criterion may be satisfied if the IMSI and the IMEI have both changed, but the criterion may not be satisfied if either the IMSI or the IMEI have not changed, regardless of whether the MSISDN has changed or not. Another example criterion is satisfied if multiple element IDs 112 have changed since the first token 114 was generated. In this example, if any one element ID 112 (but not multiple element IDs 112) has changed, the criterion is not satisfied, but if any two or more element IDs have changed, the criterion is satisfied. These are merely examples of criteria that may be evaluated at block 812.

If the criterion (or criteria) is/are satisfied at block 812, the process 800 may follow the YES route from block 812 to block 814. At 814, the network node(s) 110(1) may refrain from sending the SMS message 506 to a UE 500(1) of the user 106(1) based at least in part on the second token 114 not matching the previously-generated first token 114 at block 810, and possibly based on the criterion (or criteria) being satisfied at block 812. The token mismatch and the optional satisfaction of the criterion may indicate that using SMS as an authentication factor for MFA of the user 106(1) is relatively high risk due to the fact that the token 114 has changed since the previously-generated first token 114, which indicates that an element ID(s) 112 has changed with respect to the user 106(1). In some examples, instead of, or in addition to, refraining from sending the SMS message 506 at block 814, the network node(s) 110(1) may implement one or more additional authentication procedures in the case of a token mismatch at block 810 (and possibly the satisfaction of one or more criteria at block 812), such as requesting the user 106(1) to provide biometric information (e.g., a fingerprint, iris scan, etc.) to authenticate the user 106(1) using something other than a SMS-based MFA procedure.

At 816, the network node(s) 110(1) may send, to the enterprise system 102, a notification that the SMS message 506 was not sent to the UE 500(1) of the user 106(1) based on at least one of the element IDs 112 having changed since the first token 114 was generated. In some examples, the network node(s) 110(1) may send, at block 816, the latest token 114 (e.g., second token 114) to the enterprise system 102. In some examples, the network node(s) 110(1) may send, at block 816, a timestamp of the last known network 108 (e.g., 5GC) access with the element ID binding represented by the latest token 114 (e.g., second token 114). In some examples, the network node(s) 110(1) may send, at 816, to the enterprise system 102, a notification similar to the notification 402 described with reference to FIG. 4 (e.g., a change notification) and/or additional change information, such as information that specifies which element ID(s) 112 has/have changed, etc.

Returning with reference to blocks 810 and 812, if the tokens match at block 810, or if the tokens do not match at block 810 but the one or more criteria are not satisfied at block 812, the process 800 may proceed to block 818, either by following the YES route from block 810, or by following the NO route from block 812. At 818, the network node(s) 110(1) may determine whether a UE 500(1) of the user 106(1) is unreachable. For example, the network node(s) 110(1) may attempt to send the SMS message 506 (or any other type of message, such as a "ping" or test message) to the UE 500(1) and wait for (i) an acknowledgement from the UE 500(1) that indicates the message was delivered successfully or (ii) an error message or a timeout indicating that the UE 500(1) is unreachable. If the UE 500(1) is reachable at block 818, the process 800 may follow the NO route from block 818 to block 820, where the network node(s) 110(1) may send the SMS message 506 to the UE 500(1) of the user 106(1) based at least in part on the second token 114 matching the first token 114, or based on a failure to satisfy the one or more criteria at block 812 notwithstanding a token mismatch at block 810. Specifically, the SMS message 506 is sent to the UE 500(1) at block 820 for use in MFA to authenticate the user 106(1) so that the user 106(1) can be granted access to enterprise resources.

At 818, if the network node(s) 110(1) determines that the UE 500(1) of the user 106(1) is unreachable, the process 800 may follow the YES route from block 818 to block 822, where the network node(s) 110(1) may wait a period of time for the UE 500(1) of the user 106(1) to become reachable. This period of time the network node(s) 110(1) waits at 822 may correspond to the validity time period received from the enterprise system 102 at block 802.

At 824, the network node(s) 110(1) determines whether a timeout has occurred (e.g., whether the period of time has lapsed). As long as the period of time has not lapsed, or if the validity time period was omitted or set to an infinite amount of time (e.g., no timeout), the process 800 follows the NO route from block 824 to block 826, where the network node(s) 110(1) continues to monitor the UE 500(1) to determine if the UE 500(1) becomes reachable. For example, the network node(s) 110(1) may, at block 826, send a test message and/or determine if the UE 500(1) or another network node 110 has notified the network node(s) 110(1) that the UE 500(1) has become reachable (e.g., that the UE 500(1) has registered for services of the telecommunications network 108). If the UE 500(1) is not reachable, the process 800 may follow the NO route from block 826 back to block 822, and if the UE 500(1) does not become reachable prior to a lapse of the period of time (e.g., a timeout occurs at block 824), the process 800 may follow the YES route from block 824 to block 814, where the network node(s) 110(1) may refrain from sending the SMS message 506 to a UE 500(1) of the user 106(1), and, at 816, send, to the enterprise system 102, a notification that the SMS message 506 was not sent to the UE 500(1) of the user 106(1), as described above.

Returning with reference to block 826, if the UE 500(1) becomes reachable prior to a lapse of the period of time, the process 800 may follow the YES route from block 826 to block 804, where the network node(s) 110(1) may iterate blocks 804-810 to generate a new token 114 (e.g., a third token 114) based at least in part on the current element IDs 112 obtained at block 804, and to compare the new (third) token 114 to the previously-generated (second) token 114. Iterating blocks 804-810 is done to ensure that an element ID(s) 112 did not change while the network node(s) 110(1) was waiting for the UE 500(1) to become reachable. The remaining blocks may be performed, as described above, depending on the outcome of the token comparison.

Figure 9:
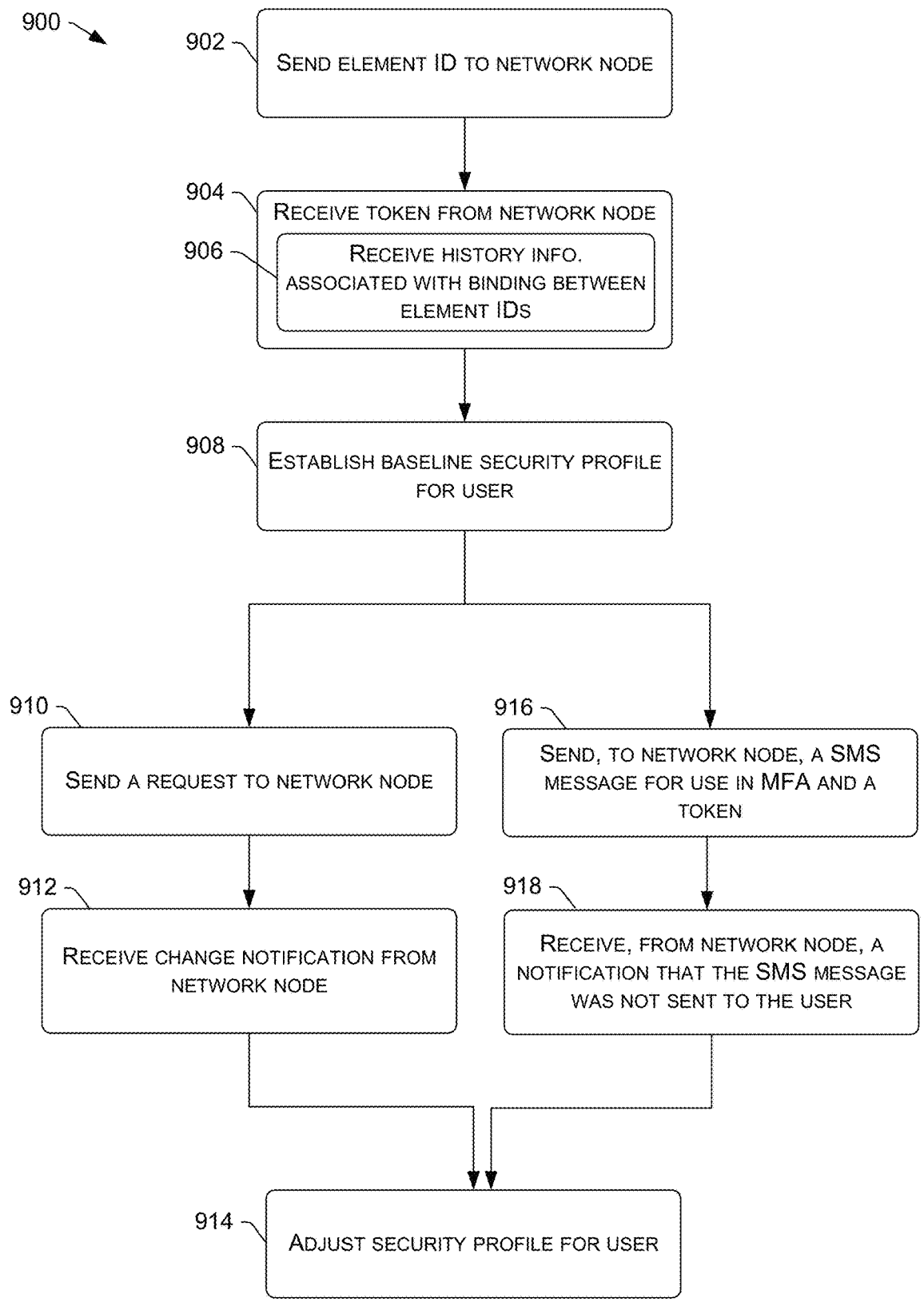
FIG. 9 illustrates a flowchart of an example process implemented by an enterprise system for establishing a baseline security profile for a user and adjusting the security profile using a token-based security risk assessment service.

FIG. 9 illustrates a flowchart of an example process implemented by an enterprise system for establishing a baseline security profile for a user and adjusting the security profile using a token-based security risk assessment service. The process 900 is described with reference to the previous figures.

At 902, an enterprise system 102 may send, to a network node 110(1) (e.g., an IVF of a 5GC) of a telecommunications network 108, an ID 112(1) of a first element 200 associated with a user 106 associated with an enterprise 104 associated with the enterprise system 102. For example, the ID 112(1) of the first element 200 may include a MSISDN, and the first element 200 may include a phone number 200(1).

At 904, the enterprise system may receive a token 114 from the network node 110(1). At sub-block 906, the enterprise system 102 may receive, from the network node 110(1), history information associated with a binding between the IDs 112 that were used to generate the token 114. For example, the history information received at sub-block 906 may include a timestamp indicating a time at which the binding was last "seen" by the network 108 (e.g., the 5GC) and/or a time of the last known access by the key elements 200 identified by the element IDs 112 represented by the token 114. In some examples, the history information may include an age of the association (or binding) between the element IDs 112, such as a time period since a time at which the binding was first "seen" by the network 108. In some examples, the history information may include information as to whether the association (or binding) between the element IDs 112 was first seen when the token 114 was generated.

At 908, the enterprise system 102 (and/or the enterprise 104 associated therewith) may establish a baseline security profile 300 associated with the user 106. This baseline security profile 300 is indicative of the level of trust in using SMS as an authentication factor for MFA of the user 106. Once a baseline security profile 300 is established for the user 106 at block 908, the enterprise 104 can be notified of any changes to an element ID(s) 112 of the user 106 since the last token 114 was generated for the user 106.

At 910, for example, the enterprise system 102 may send a request to the network node 110(1). For example, the request sent at block 910 may be a first request to determine whether one or more element IDs 112 associated with a user 106 have changed since the previous token 114 was generated. In other words, the first request may be one of a series of periodic requests made by the enterprise system 102 to check whether any element ID(s) has/have changed with respect to a particular user 106 (or group of users 106). In some examples, the first request includes a first token 114 that the enterprise system 102 most-recently received from the network node 110(1). In another example, the request sent at block 910 may be a second request to subscribe to change notifications from the network node 110(1). That is, the enterprise 104 may subscribe to receive change notifications so that it does not have to check on the status of an association between element IDs 112 with respect to a user 106; rather, it can receive notifications if anything changes based on the subscription request.

At 912, the enterprise system 102 may receive, from the network node(s) 110(1), a notification 402 that at least one of element IDs 112 has changed since the first token 114 was generated. In some examples, additional information may be received at block 912 from the network node 110(1), such as information indicating which element(s) ID 112 has/have changed.

At 914, based on receiving the change notification 402 at block 912, the enterprise system 102 (and/or the enterprise 104) may adjust the security profile 300 of the user 106. For example, the security profile 300 of the user 106 may be reduced to indicate a lower level of trust in using SMS as an authentication factor for MFA of the user 106.

Additionally, or alternatively, at 916, after a baseline security profile 300 is established for the user 106 at block 908, the enterprise system 102 may send, to the network node 110(1), (i) a SMS message 506 for use in authenticating the user 106 using MFA, and (ii) a first token 114, such as the token received at block 904, or any token generated thereafter, but prior to block 916. In some examples, the enterprise system 102 sends, to the network node(s) 110(1), a validity time period associated with the SMS message 506 and/or the authentication information/contents carried by the SMS message 506, which informs the MFA component 124 how long to wait for a UE 500(1) of the user 106 to become reachable, if initially unreachable.

At 918, the enterprise system 102 may receive, from the network node(s) 110(1), a notification that the SMS message 506 was not sent to the UE 500(1) of the user 106 based on at least one of the element IDs 112 having changed since the first token 114 was generated. In some examples, the enterprise system 102 may receive, at block 918, the latest token 114 (e.g., a second token 114) from the network node(s) 110(1). In some examples, the enterprise system 102 may receive, at block 918, a timestamp of the last known network 108 (e.g., 5GC) access with the element ID binding represented by the latest token 114 (e.g., second token 114). In some examples, the enterprise system 102 may receive, at 918, from the network node(s) 110(1), a notification similar to the notification 402 described with reference to FIG. 4 (e.g., a change notification) and/or additional change information, such as information that specifies which element ID(s) 112 has/have changed, etc.

At 914, based on receiving the notification at block 918, the enterprise system 102 (and/or the enterprise 104) may adjust the security profile 300 of the user 106. For example, the security profile 300 of the user 106 may be reduced to indicate a lower level of trust in using SMS as an authentication factor for MFA of the user 106.

Figure 10:
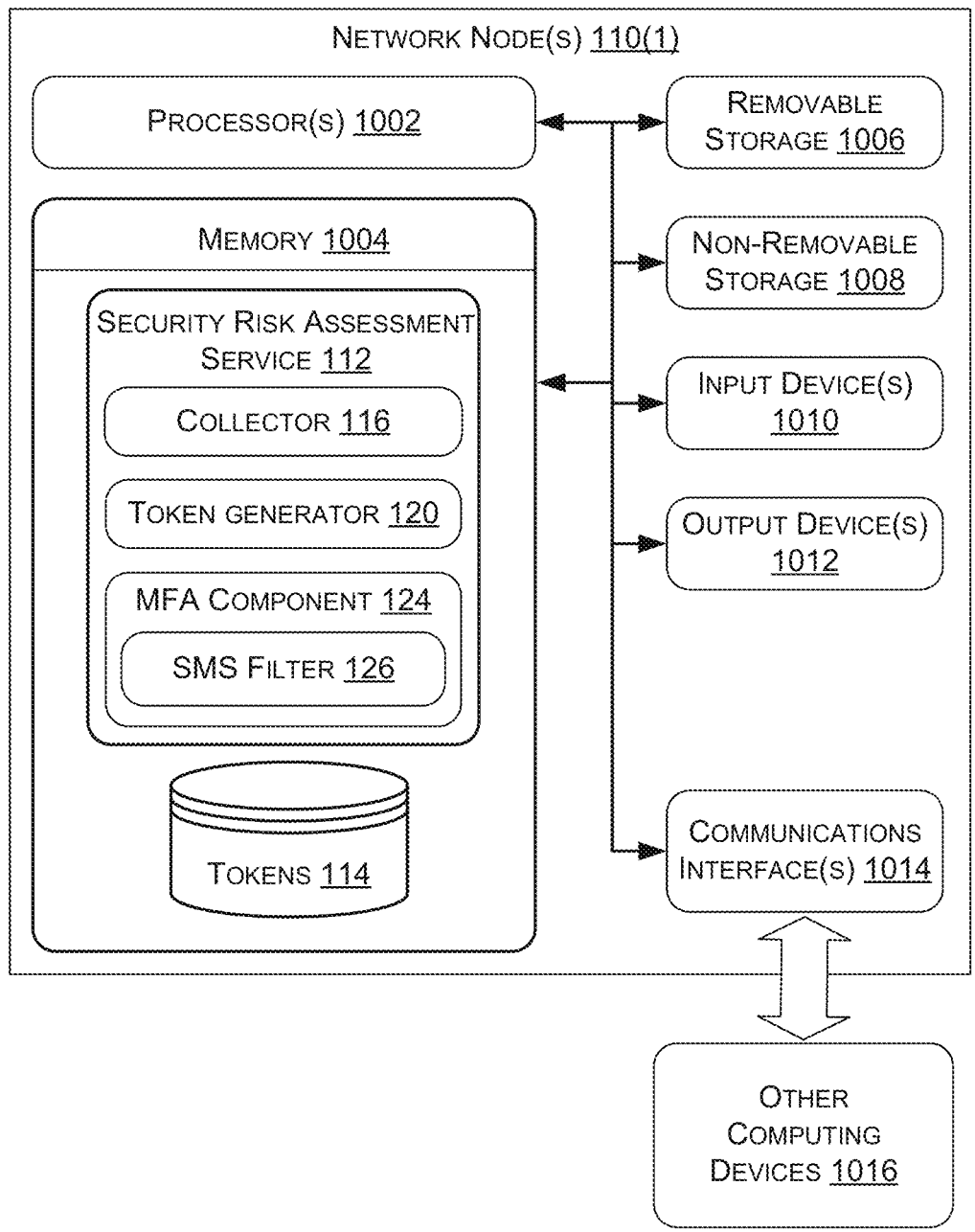
FIG. 10 is a block diagram of an example network node(s) of a telecommunications network with logic to implement a token-based security risk assessment service for MFA, according to various embodiments.

FIG. 10 is a block diagram of an example network node(s) 110(1) of a telecommunications network 108 with logic to implement a token-based security risk assessment service 112 for MFA, according to various embodiments. In some examples, the network node 110(1) represents an IVF of a 5GC. As shown, the network node 110(1) may include one or more processors 1002 and one or more forms of computer-readable memory 1004. The network node 110(1) may also include additional storage devices. Such additional storage may include removable storage 1006 and/or non-removable storage 1008.

The network node 110(1) may further include input devices 1010 (e.g., a touch screen, keypad, keyboard, mouse, pointer, microphone, etc.) and output devices 1012 (e.g., a display, printer, speaker, etc.) communicatively coupled to the processor(s) 1002 and the computer-readable memory 1004. The network node 110(1) may further include communications interface(s) 1014 that allow the network node 110(1) to communicate with other computing devices 1016 (e.g., other network nodes 110(2)-(N), enterprise systems, such as the enterprise system 102, UEs, such as the UE 500(1), etc.) such as via a network. The communications interface(s) 1014 may facilitate transmitting and receiving wired and/or wireless signals over any suitable communications/data technology, standard, or protocol, as described herein. For example, the communications interface(s) 1014 can comprise a wired interface and/or one or more of a cellular radio, a wireless (e.g., IEEE 802.1x-based) interface, a Bluetooth® interface, and so on.

In various embodiments, the computer-readable memory 1004 comprises non-transitory computer-readable memory 1004 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1004 may also be described as computer storage media and may include volatile and nonvolatile, removable and non-removable media implemented in any method or technology for storage of information, such as computer readable instructions, data structures, program modules, or other data. Computer-readable memory 1004, removable storage 1006 and non-removable storage 1008 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the network node 110(1). Any such computer-readable storage media may be part of the network node 110(1).

The memory 1004 can include the security risk assessment service 112 and its various subcomponents describe elsewhere herein (i.e., computer-executable instructions (or logic) that, when executed, by the processor(s) 1002, perform the various acts and/or processes disclosed herein). The memory 1004 is also shown as storing tokens 114 generated on behalf of enterprise customers and associated with users 106 associated with those enterprise customers.

Figure 11:
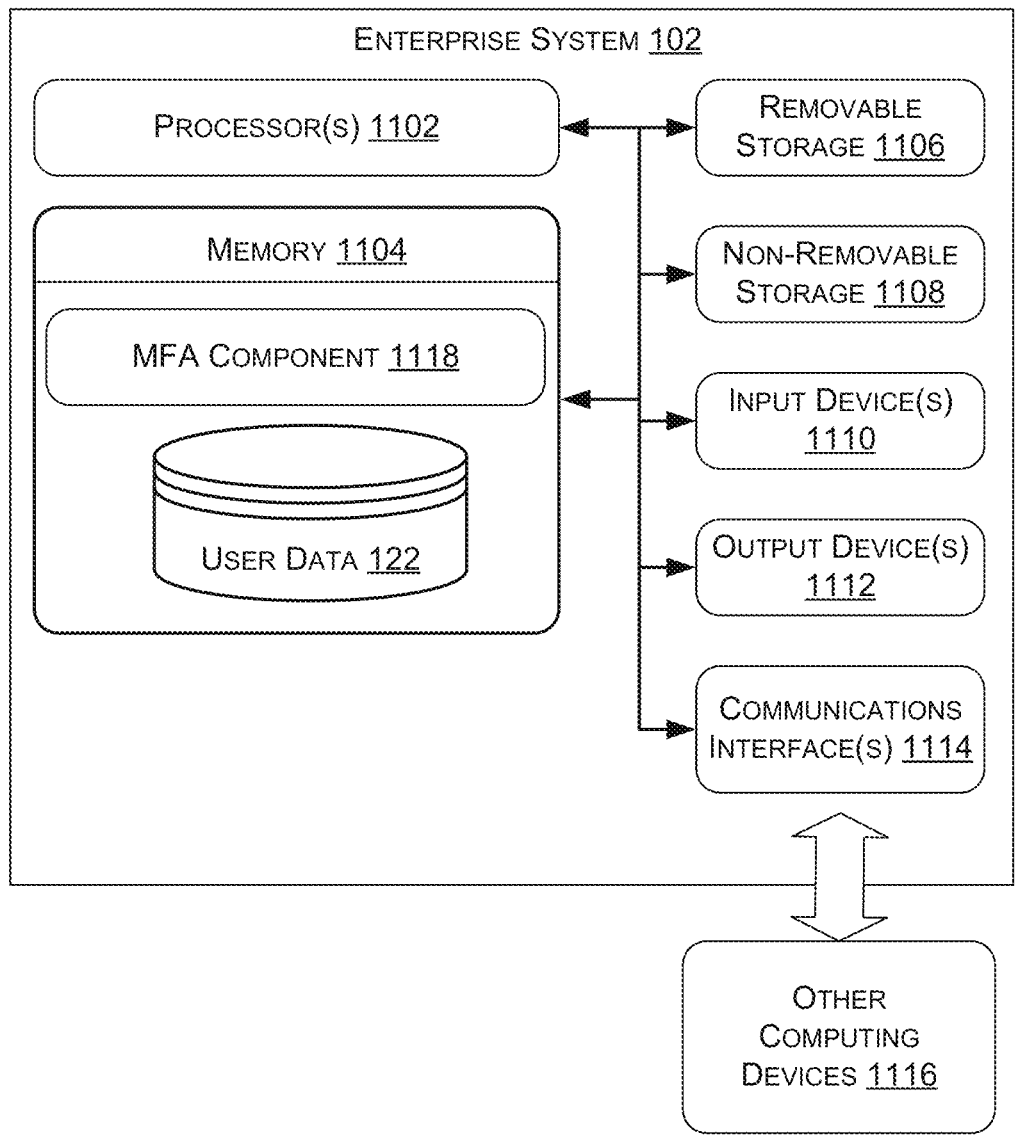
FIG. 11 is a block diagram of an example enterprise system with logic to utilize a token-based security risk assessment service for MFA, according to various embodiments.

FIG. 11 is a block diagram of an example enterprise system 102 with logic to utilize a token-based security risk assessment service 112 for MFA, according to various embodiments. As shown, the enterprise system 102 may include one or more processors 1102 and one or more forms of computer-readable memory 1104. The enterprise system 102 may also include additional storage devices. Such additional storage may include removable storage 1106 and/or non-removable storage 1108. The memory 1104, the removable storage 1106, and the non-removable storage 1108 may be implemented similarly to the memory 1004, removable storage 1006, and non-removable storage 1008 described above with reference to FIG. 10, and will not be described further for the sake of brevity.

The enterprise system 102 may further include input devices 1110, output devices 1112, and communications interface(s) 1114 for communicating with other computing devices 1116. These too may be implemented similarly to the input devices 1010, output devices 1012, and communications interface(s) 1014 described above with reference to FIG. 10, and will not be described further for the sake of brevity.

The memory 1004 can include a MFA component 1118 (i.e., computer-executable instructions (or logic) that, when executed, by the processor(s) 1102, perform the various acts and/or processes disclosed herein). For example, the MFA component 1118 is configured to carry out the process 900, among other things. The memory 1104 can further be used to store user data 122, as described herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A network node of a telecommunications network, the network node comprising:
   a processor; and
   memory storing computer-executable instructions that, when executed by the processor, cause the network node to:
   receive, from an enterprise system, a first element identifier (ID) of a first element associated with a user associated with an enterprise associated with the enterprise system;
   validate the first element ID;
   obtain, from one or more other network nodes of the telecommunications network, and based at least in part on validating the first element ID, one or more additional element IDs of one or more additional elements associated with the user;
   generate a token based at least in part on the first element ID and the one or more additional element IDs; and
   send the token to the enterprise system.

2. The network node of claim 1, wherein the one or more additional element IDs comprise a second element ID of a second element and a third element ID of a third element.

3. The network node of claim 2, wherein:
   the first element ID comprises a Mobile Station International Subscriber Directory Number (MSISDN) and the first element comprises a phone number;
   the second element ID comprises an International Mobile Subscriber Identity (IMSI) and the second element comprises a Universal Subscriber Identity Module (USIM); and
   the third element ID comprises an International Mobile Equipment Identity (IMEI) and the third element comprises a user equipment (UE).

4. The network node of claim 1, wherein generating the token comprises:
   providing, as input to a hash function, the first element ID and the one or more additional element IDs; and
   generating, as output from the hash function, a hash value as the token.

5. The network node of claim 4, wherein the hash function is a cryptographic hash function.

6. The network node of claim 1, wherein the token represents an association between the first element ID and the one or more additional element IDs, and wherein the computer-executable instructions, when executed by the processor, further cause the network node to send, to the enterprise system, history information associated with the association.

7. The network node of claim 1, wherein the token is a first token, and wherein the computer-executable instructions, when executed by the processor, further cause the network node to, after generating the first token:
   obtain, as current element IDs from the one or more other network nodes, the first element ID and the one or more additional element IDs;
   generate a second token based at least in part on the current element IDs;
   determine, based on comparing the first token to the second token, that the second token does not match the first token; and
   send, to the enterprise system, a notification that at least one of the first element ID has changed or the one or more additional element IDs have changed since the first token was generated.

8. The network node of claim 7, wherein the one or more additional element IDs comprise a second element ID of a second element and a third element ID of a third element, and wherein the computer-executable instructions, when executed by the processor, further cause the network node to send, to the enterprise system, an indication that the second element ID has changed.

9. The network node of claim 7, wherein the computer-executable instructions, when executed by the processor, further cause the network node to receive, from the enterprise system, at least one of:
   a first request to determine whether an element ID has changed since the first token was generated; or a second request to subscribe to change notifications from the network node,
wherein the second token is generated in response to at least one of the first request or the second request.

10. The network node of claim 1, wherein the token is a first token, and wherein the computer-executable instructions, when executed by the processor, further cause the network node to, after generating the first token:
receive, from the enterprise system:
a Short Message Service (SMS) message for use in authenticating the user using multi-factor authentication (WA); and
the first token;
obtain, as current element IDs from the one or more other network nodes, the first element ID and the one or more additional element IDs;
generate a second token based at least in part on the current element IDs;
determine, based on comparing the first token to the second token, that the second token matches the first token; and
send the SMS message to a user equipment (UE) of the user based at least in part on the second token matching the first token.

11. The network node of claim 1, wherein the token is a first token, and wherein the computer-executable instructions, when executed by the processor, further cause the network node to, after generating the first token:
receive, from the enterprise system:
a Short Message Service (SMS) message for use in authenticating the user using multi-factor authentication (WA); and
the first token;
obtain, as current element IDs from the one or more other network nodes, the first element ID and the one or more additional element IDs;
generate a second token based at least in part on the current element IDs;
determine, based on comparing the first token to the second token, that the second token does not match the first token;
refrain from sending the SMS message to a user equipment (UE) of the user based at least in part on the second token not matching the first token; and
send, to the enterprise system, a notification that the SMS message was not sent to the UE of the user.

12. The network node of claim 11, wherein the computer-executable instructions, when executed by the processor, further cause the network node to:
determine that multiple element IDs have changed since the first token was generated,
wherein refraining from sending the SMS message is based on determining that the multiple element IDs have changed since the first token was generated.

13. The network node of claim 1, wherein the token is a first token, and wherein the computer-executable instructions, when executed by the processor, further cause the network node to, after generating the first token:
receive, from the enterprise system:
a Short Message Service (SMS) message for use in authenticating the user using multi-factor authentication (WA); and
the first token;
obtain, as current element IDs from the one or more other network nodes, the first element ID and the one or more additional element IDs;
generate a second token based at least in part on the current element IDs;
determine, based on comparing the first token to the second token, that the second token matches the first token;
determine that a user equipment (UE) of the user is unreachable;
wait a period of time for the UE of the user to become reachable;
after the UE of the user becomes reachable prior to a lapse of the period of time:
obtain, as new current element IDs from the one or more other network nodes, the first element ID and the one or more additional element IDs;
generate a third token based at least in part on the new current element IDs; and
determine, based on comparing the second token to the third token, that the third token does not match the second token;
refrain from sending the SMS message to the UE of the user based at least in part on the third token not matching the second token; and
send, to the enterprise system, a notification that the SMS message was not sent to the UE of the user.

14. A method comprising:
receiving, by a network node of a telecommunications network, from an enterprise system:
a Short Message Service (SMS) message for use in authenticating a user associated with an enterprise associated with the enterprise system using multi-factor authentication (WA); and
a first token;
obtaining, by the network node, from one or more other network nodes of the telecommunications network, element identifiers (IDs) of elements associated with the user;
generating, by the network node, a second token based at least in part on the element IDs;
determining, by the network node comparing the first token to the second token, that the second token matches the first token; and
sending, by the network node, the SMS message to a user equipment (UE) of the user based at least in part on the second token matching the first token.

15. The method of claim 14, wherein the element IDs comprise:
a Mobile Station International Subscriber Directory Number (MSISDN);
an International Mobile Subscriber Identity (IMSI); and
an International Mobile Equipment Identity (IMEI).

16. The method of claim 14, wherein the generating of the second token comprises:
providing the element IDs as input to a hash function; and
generating, as output from the hash function, a hash value as the second token.

17. A method comprising:
receiving, by a network node of a telecommunications network, from an enterprise system:
a Short Message Service (SMS) message for use in authenticating a user associated with an enterprise associated with the enterprise system using multi-factor authentication (WA); and
a first token;
obtaining, by the network node, from one or more other network nodes of the telecommunications network, element identifiers (IDs) of elements associated with the user;

generating, by the network node, a second token based at least in part on the element IDs;

determining, based on comparing the first token to the second token, that the second token does not match the first token;

refraining from sending the SMS message to a user equipment (UE) of the user based at least in part on the second token not matching the first token; and sending, to the enterprise system, a notification that the SMS message was not sent to the UE of the user.

18. The method of claim 17, wherein the element IDs comprise:
   a Mobile Station International Subscriber Directory Number (MSISDN);
   an International Mobile Subscriber Identity (IMSI); and
   an International Mobile Equipment Identity (IMEI).

19. The method of claim 17, further comprising:
   determine that a particular element ID of the element IDs has changed since the first token was generated,
   wherein the refraining from sending the SMS message is based on determining that the particular element IDs has changed since the first token was generated.

20. The method of claim 17, wherein the generating of the second token comprises:
   providing the element IDs as input to a hash function; and
   generating, as output from the hash function, a hash value as the second token.

\* \* \* \* \*